US012796856B2

(12) United States Patent
Koller et al.

(10) Patent No.: US 12,796,856 B2
(45) Date of Patent: Nov. 17, 2026

(54) METHODS AND SYSTEMS FOR FORMING CUSTOMIZED BEVERAGES

(71) Applicant: Starbucks Corporation, Seattle, WA (US)

(72) Inventors: Izaak M. Koller, Seattle, WA (US); Michael R. Cummer, Seattle, WA (US); Nguyen Lai, Lynnwood, WA (US); Bradey D. Honsinger, Everett, WA (US); Cameron Gilbert, Seattle, WA (US); Kathleen Pease, Seattle, WA (US); John A. Johnson, Bainbridge Island, WA (US); Brian Shay, Leavenworth, WA (US)

(73) Assignee: Starbucks Corporation, Seattle, WA (US)

( * ) Notice: Subject to any disclaimer, the term of this patent is extended or adjusted under 35 U.S.C. 154(b) by 817 days.

(21) Appl. No.: 18/325,734

(22) Filed: May 30, 2023

(65) Prior Publication Data

US 2023/0380623 A1 Nov. 30, 2023

Related U.S. Application Data

(60) Provisional application No. 63/365,559, filed on May 31, 2022.

(51) Int. Cl.
*A47J 31/52* (2006.01)
*G06F 3/0482* (2013.01)

(52) U.S. Cl.
CPC ........... *A47J 31/521* (2018.08); *A47J 31/525* (2018.08); *G06F 3/0482* (2013.01)

(58) Field of Classification Search
CPC ...... A47J 31/52; A47J 31/4403; A47J 31/521; A47J 31/525; A47J 31/007; A47J 31/42;
(Continued)

(56) References Cited

U.S. PATENT DOCUMENTS 4,160,512 A 7/1979 Cleland
5,255,819 A 10/1993 Peckels
(Continued)

FOREIGN PATENT DOCUMENTS

CA 2940409 A1 11/2015
CN 109700318 5/2019
(Continued)

OTHER PUBLICATIONS

Anonymous, "National Restaurant Association Show® Kicks Off Saturday in Chicago"; National Restaurant Association Show; https://www.nationalrestaurantshow.com/national-restaurant-association-showr-kicks-saturday-chicago, dated May 20, 2022.
(Continued)

*Primary Examiner* — Vy T Nguyen
(74) *Attorney, Agent, or Firm* — Knobbe, Martens, Olson & Bear, LLP

(57) ABSTRACT

A method for preparing a beverage can include receiving one or more drink orders and adding the one or more drink orders on a queue. The method can also include receiving a selection of the one or more drink orders on the queue and building one or more recipes for the selected drink orders on the queue. The method can further include sending build steps from the one or more recipes to corresponding substations. For each of the build steps, the method can include instructing the corresponding substation to dispense an ingredient or execute an action. The method can also include determining each of the build steps have been completed by a user.

31 Claims, 7 Drawing Sheets

(58) Field of Classification Search

CPC ...... A47J 31/5253; A47J 31/002; A47J 31/20; A47J 31/3609; A47J 31/3619; A47J 31/40; A47J 31/402; A47J 31/404; A47J 31/44; A47J 31/46; A47J 31/467; A47J 31/5251; A47J 31/60; A47J 42/38; A47J 43/27; B67D 1/0021; B67D 1/0041; B67D 1/0878; B67D 1/0882; B67D 1/0888; B67D 1/1202; B67D 1/1234; B67D 1/1236; B67D 3/00; G07F 13/065; G07F 17/0078; G07F 9/0235; A23F 3/18; A23F 5/00; A23F 5/26; A23L 2/52; A23V 2002/00; B65B 2220/14; B65B 29/022; B65B 31/00; B65D 85/8043

USPC ......... 99/285, 279, 290, 291, 280, 281, 286, 99/287, 294, 323; 222/129.1, 1, 129, 222/129.4, 146.4, 152, 481, 482, 52, 7; 700/239, 233, 236, 241, 244; 137/340, 137/883; 165/100, 104.19, 154, 47, 53, 165/76; 426/433, 435

See application file for complete search history.

(56) References Cited

U.S. PATENT DOCUMENTS 5,343,907 A 9/1994 Wagner
5,350,082 A 9/1994 Kiriakides, Jr. et al.
5,575,405 A 11/1996 Stratton et al.
5,603,430 A 2/1997 Loehrke et al.
6,053,359 A 4/2000 Goulet et al.
6,216,918 B1 4/2001 Saveliev et al.
7,439,859 B2 10/2008 Humphrey
7,617,850 B1 11/2009 Dorney
7,648,050 B1 1/2010 Ehlers
7,669,740 B2 3/2010 Saunders et al.
8,032,251 B2 10/2011 Monn
8,109,301 B1 2/2012 Denise
8,161,865 B2 4/2012 Tso et al.
8,756,950 B2 6/2014 Brunner et al.
8,910,563 B2 12/2014 Hulett et al.
9,321,387 B2 4/2016 Lamb
9,808,114 B1 11/2017 Heys et al.
9,809,439 B2 11/2017 Falco, III
10,131,528 B2 11/2018 Webster et al.
10,143,331 B1 12/2018 Heys et al.
10,301,159 B2 5/2019 Feola
10,414,642 B2 9/2019 Melville, Jr. et al.
10,544,028 B2 1/2020 Guy et al.
10,638,870 B2 5/2020 Studor et al.
10,783,507 B1 9/2020 Votolato
11,116,352 B2 9/2021 Herbert et al.
11,440,784 B2 9/2022 Venkatakrishnan et al.
11,535,504 B2 12/2022 Venkatakrishnan et al.
11,738,987 B2 8/2023 Degnan et al.
11,767,213 B2 9/2023 Zubarik
12,281,000 B2 4/2025 Venkatakrishnan et al.
12,297,091 B2 5/2025 Venkatakrishnan et al.
12,304,798 B2 5/2025 Venkatakrishnan et al.
12,312,229 B2 5/2025 Venkatakrishnan et al.
12,319,556 B2 6/2025 Venkatakrishnan et al.
2004/0167664 A1 8/2004 Griffin
2005/0236429 A1 10/2005 Duck et al.
2006/0037969 A1 2/2006 Jennings et al.
2006/0118581 A1 6/2006 Clark
2006/0175352 A1 8/2006 Emmendorfer et al.
2009/0069949 A1 3/2009 Carpenter et al.
2009/0266245 A1 10/2009 Kanuma et al.
2010/0268378 A1* 10/2010 Sharpley ............ G06Q 30/0603 700/236
2011/0168775 A1 7/2011 Van Zetten
2011/0173082 A1 7/2011 Breitenbach et al.
2012/0325845 A1 12/2012 Newman et al.
2013/0156903 A1 6/2013 Bombeck et al.
2013/0314244 A1 11/2013 Hershberger et al.
2014/0107835 A1 4/2014 Biasi et al.
2014/0114469 A1 4/2014 Givens et al.
2014/0166053 A1 6/2014 Carson et al.
2014/0209634 A1 7/2014 Metropulos et al.
2015/0013545 A1 1/2015 Egli et al.
2015/0143393 A1 5/2015 Diachenko
2016/0090288 A1 3/2016 Givens, Jr. et al.
2016/0196711 A1 7/2016 Castellani
2017/0011442 A1 1/2017 Hu et al.
2017/0046904 A1 2/2017 Studor
2017/0119200 A1 5/2017 Bressi
2017/0190558 A1 7/2017 Ubidia
2017/0215631 A1 8/2017 Studor et al.
2017/0253473 A1 9/2017 Melville, Jr. et al.
2017/0283236 A1 10/2017 Jagannathan et al.
2017/0365017 A1 12/2017 Ells
2018/0072557 A1 3/2018 Bertness et al.
2018/0303116 A1 10/2018 Rubin et al.
2019/0112174 A1 4/2019 Alix et al.
2019/0174950 A1 6/2019 Hendrickson et al.
2020/0154949 A1 5/2020 Klein et al.
2021/0279666 A1 9/2021 Sun
2021/0395069 A1 12/2021 Burda
2023/0021411 A1 1/2023 Venkatakrishnan et al.
2023/0257254 A1 8/2023 Jeong et al.
2023/0284818 A1* 9/2023 Xu .......................... A47J 31/42
2023/0416071 A1 12/2023 Cline et al.
2024/0375928 A1 11/2024 Venkatakrishnan et al.
2024/0375929 A1 11/2024 Venkatakrishnan et al.
2024/0375930 A1 11/2024 Venkatakrishnan et al.
2025/0033946 A1 1/2025 Venkatakrishnan et al.
2025/0169643 A1 5/2025 Abrahamsen et al.
2025/0185313 A1 6/2025 Chen et al.

FOREIGN PATENT DOCUMENTS

CN 109863112 6/2019
FR 1464613 A 1/1967
WO WO 97/41763 11/1997
WO WO 2001/62127 A2 8/2001
WO WO 2006/050563 A1 5/2006
WO WO 2016/137930 A1 9/2016
WO WO 2019/006216 A1 1/2019
WO WO 2019/109137 A1 6/2019
WO WO 2021/146406 A2 7/2021
WO WO 2023/003864 A1 1/2023
WO WO 2023/129511 A1 7/2023
WO WO 2023/235710 12/2023
WO WO 2023/250358 A1 12/2023
WO WO 2025/117834 6/2025

OTHER PUBLICATIONS

International Search Report and Written Opinion issued in International Patent Application No. PCT/US2023/068789, dated Sep. 28, 2023 in 19 pages.
International Search Report and Written Opinion in application No. PCT/US2021/013412, mailed on Aug. 4, 2021, in 23 pages.
International Preliminary Report on Patentability and Written Opinion issued in International Patent Application No. PCT/US2023/067633, dated Nov. 7, 2024 in 6 pages.
International Preliminary Report on Patentability and Written Opinion issued in International Patent Application No. PCT/US2023/068789, dated Dec. 18, 2024, in 7 pages.
"China's First Fully Robotic Coffee Booth by Cofe+. Is it a serious competition for Starbuck's & Co?" published on Jul. 4, 2021; for purposes of examination consider retrieved from the internet on Jul. 28, 2023, <https://www.youtube.com/watch?v=PKEh_luW5o4>.
International Search Report and Written Opinion issued in International Patent Application No. PCT/US2023/067633, dated Sep. 6, 2023 in 13 pages.

* cited by examiner

METHODS AND SYSTEMS FOR FORMING CUSTOMIZED BEVERAGES

CROSS-REFERENCE TO RELATED APPLICATION(S)

This application claims the benefit of U.S. Provisional Application No. 63/365,559, filed May 31, 2022, which is hereby incorporated by reference herein in its entirety.

BACKGROUND

Field

The present disclosure relates to systems and methods for forming customized beverages and in certain embodiments to systems and methods for creating recipes for custom drink orders, controlling a drink station to dispense ingredients for the custom drink order and sensing actions have been taken to form the custom drink order.

Description of the Certain Related Art

Beverages at a coffee store can include a large number of ingredients that can be combined in various ways and at various doses for customized drinks. Conventionally, in response to receiving a beverage order, a barista recollects the recipe from memory or a bespoke request from a customer and creates the beverage by manually retrieving ingredients from their respective containers and manually adding the ingredients at the correct time.

SUMMARY

The systems, methods and devices of this disclosure each have several innovative aspects, no single one of which is solely responsible for the desirable attributes disclosed herein.

In one aspect, a method for preparing a beverage can include receiving one or more drink orders and adding the one or more drink orders on a queue. The method can also include receiving a selection of the one or more drink orders on the queue and building one or more recipes for the selected drink orders on the queue. The method can further include sending build steps from the one or more recipes to corresponding substations. For each of the build steps, the method can include instructing the corresponding substation to dispense an ingredient or execute an action. The method can also include determining each of the build steps have been completed by a user.

In some configurations, the method can include determining each of the build steps require a predecessor. In instructing the corresponding substation to dispense the ingredient, the method can include dispensing a predetermined amount of the ingredient into a dosing vessel in a first position based on the corresponding build step, determining the predetermined amount of the ingredient has been dispensed from the dosing vessel by the user, and determine the dosing vessel has been returned to the first position by the user. In instructing the corresponding substation to dispense the ingredient, the method include determining a container is positioned in a first position at the corresponding substation by the user, dispensing a predetermined amount of the ingredient into the container based on the corresponding build step, and determining the predetermined amount of the ingredient has been dispensed from the container or the container has been removed from the substation by the user.

In instructing the corresponding substation to execute the action, the method includes determining a container is positioned in a first position at the corresponding substation by the user, activating an equipment to perform the action, and determining an ingredient has been dispensed from the container or the container has been removed from the substation by the user. In instructing the corresponding substation to dispense the ingredient, the method can include determining a trigger at a corresponding substation has been initiated by the user, dispensing an amount of the ingredient into the container, and determining the amount of the ingredient has been dispensed from the container or the container has been removed from the substation by the user. In some configurations, the amount of the ingredient dispensed into the container can be based on a time the trigger has been activated. In other configurations, the amount of the ingredient dispensed into the container can be predetermined amount based on the corresponding build step. The method can further include instructing the corresponding substation to execute the action comprises sensing a manual action has been taken at the corresponding substation by the user. The selection of one or more drink orders on the queue can include at least two drink orders. The method can also include displaying the one or more drink orders on the queue on a main display. The method can further include displaying the build step sent to the corresponding substation on a display at the corresponding substation. The method can also include estimating a build time for each of the one or more drink orders. Estimating the build time for each of the one or more drink orders can be based on a number of user steps. Estimating the build time for each of the one or more drink orders can be based on a comparison of an estimated time to complete each of the build steps and an actual time to complete each of the build steps.

In another aspect, a method for preparing multiple beverages can include receiving multiple drink orders, adding the multiple drink orders on a queue, receiving a selection of a plurality of drink orders of the multiple drink orders on the queue, building recipes for each of the selected plurality of drink orders on the queue, and sending build steps from the recipes for each of the selected plurality of drink orders to corresponding substations. For each of the build steps, the method can include instructing the corresponding substation to dispense an ingredient or execute an action. The method can also include determining each of the build steps have been completed by a user.

The method can also include determining each of the build steps require a predecessor. Instructing the corresponding substation to dispense the ingredient can include dispensing a predetermined amount of the ingredient into a dosing vessel in a first position based on the corresponding build step, determining the predetermined amount of the ingredient has been dispensed from the dosing vessel by the user, and determine the dosing vessel has been returned to the first position by the user. Instructing the corresponding substation to dispense the ingredient can include determining a container is positioned in a first position at the corresponding substation by the user, dispensing a predetermined amount of the ingredient into the container based on the corresponding build step, and determining the predetermined amount of the ingredient has been dispensed from the container or the container has been removed from the substation by the user. Instructing the corresponding substation to execute the action can include determining a container is positioned in a first position at the corresponding substation by the user, activating an equipment to perform the action, and determining an ingredient has been dispensed from the container or the container has been removed from the substation by the user.

In some configurations, instructing the corresponding substation to dispense the ingredient can include determining a trigger at a corresponding substation has been initiated by the user, dispensing an amount of the ingredient into the container, and determining the amount of the ingredient has been dispensed from the container or the container has been removed from the substation by the user. The amount of the ingredient can be based on a time the trigger has been activated. The amount of the ingredient dispensed into the container can be a predetermined amount based on the corresponding build step. Instructing the corresponding substation to execute the action can include sensing a manual action has been taken at the corresponding substation by the user. The selection of one or more drink orders on the queue can include at least two drink orders. The method can further include displaying the plurality of drink orders on the queue on a main display. The method can also include displaying the build step sent to the corresponding substation on a display at the corresponding substation. The method can further include estimating a build time for each of the plurality of drink orders. Estimating the build time for each of the plurality of drink orders can be based on a number of user steps. Estimating the build time for each of the plurality of drink orders can be based on a comparison of an estimated time to complete each of the build steps and an actual time to complete each of the build steps.

In yet another aspect, the beverage preparation system can include a plurality of substations, each of the plurality of substations configured to dispense an ingredient or perform an action and a main controller. The main controller can be configured to receive one or more drink orders, add the one or more drink orders on a queue, receive a selection of the one or more drink orders on the queue, build one or more recipes for the selected drink orders on the queue, and send build steps from the one or more recipes to a corresponding substation. For each of the build steps, the main controller can instruct the corresponding substation to dispense an ingredient or execute an action and determine each of the build steps has been completed.

In some configurations, the system can include a main display configured to display the one or more drink orders on the queue. The main display can include a user interface. Each of the plurality of substations can include a display configured to display the build step received at the corresponding substation. The display of each of the plurality of substations can be configured to display a drink name. The display of each of the plurality of substations displaying build steps for a particular drink order can be configured to display the same visual indicators. The plurality of substations can include one or more sensors configured to sense one or more actions. The one or more sensors can be configured to sense when a container is removed or added. The plurality of substations can include one or more triggers configured to initiate dispensing an ingredient or activating an action.

In one aspect, a system to prepare one or more beverages can include one or more processors and a computer-readable storage medium including machine-readable instructions that, when executed by the one or more processors, cause the one or more processors to identify, from a queue, one or more drink orders corresponding to the one or more beverages, dynamically generate computer-executable build instructions for building each of the one or more beverages, identify one more substations, each of the one or more substations corresponding to a respective portion of the computer-executable build instructions, and transmit a respective portion of the computer-executable build instructions to each of the one or more substations. Each of the one or more substations can execute a respective portion of the computer-executable build instructions. Executing a respective portion of the computer-executable build instructions can cause each of the one or more substations to perform a build step to build the one or more beverages.

In some configurations, to dynamically generate the computer-executable build instructions for building each of the one or more beverages, execution of the machine-readable instructions by the one or more processors, can cause the one or more processors to access a model for dynamically generating build steps for building the one or more beverages. To generate the build steps, the model can be configured to parse data associated with the one or more drink orders. The data associated with the one or more drink orders can include at least one of customer data associated with a customer, wherein the customer is associated with the one or more drink orders, step sequence data, step technique data, ingredient data, or step data. The model can be configured to generate the build steps based on parsing the data associated with the one or more drink orders, wherein the build steps comprise the build step. The model can include a machine learning model. Executing the respective portion of the computer-executable build instructions can further automatically cause each of the one or more substations to display at least one of the one or more beverages, the build step, nutritional data associated with the one or more beverages, a time period associated with building the one or more beverages, customer data associated with a customer, wherein the customer is associated with the one or more drink orders, step sequence data, step technique data, ingredient data, or step data. The build step can include dispensation of an ingredient of the one or more beverages. Execution of the machine-readable instructions by the one or more processors can further cause the one or more processors to monitor building of the one or more beverages, determine a time period for the one or more beverages based on monitoring the building of the one or more beverages, and dynamically update a time period for one or more associated beverages based at least in part on the time period for the one or more beverages. The computer-executable build instructions can be divided into a plurality of portions. Execution of the machine-readable instructions by the one or more processors can further cause the one or more processors to dynamically assign a respective portion of the plurality of portions of the computer-executable build instructions to each of the one or more substations. The one or more drink orders can include a first drink order associated with a first customer, a second drink order associated with the first customer, and a third drink order associated with a second customer. Execution of the machine-readable instructions by the one or more processors can further cause the one or more processors to: receive a selection of the first drink order and dynamically generate a sequence of the one or more drink orders based on the selection of the first drink order, wherein the first drink order and the second drink order are ordered within the sequence such that the first drink order and the second drink order are fulfilled within a same time period, wherein to dynamically generate computer-executable build instructions for building each of the one or more beverages execution of the machine-readable instructions by the one or more processors, further causes the one or more processors to dynamically generate computer-executable build instructions for building each of the one or more beverages according to the sequence. To dynamically generate the sequence execution of the machine-readable instructions by the one or more processors can further cause the one or more processors to access a machine learning model for dynamically generating the sequence, wherein the machine learning model is configured to generate the sequence based on at least one of customer data or store data.

In yet another aspect, a non-transitory computer-readable medium storing computer-executable instructions that, when executed by a processor, can configure the processor to identify, from a queue, one or more drink orders corresponding to the one or more beverages, dynamically generate computer-executable build instructions for building each of the one or more beverages, identify one more substations, each of the one or more substations corresponding to a respective portion of the computer-executable build instructions, and transmit a respective portion of the computer-executable build instructions to each of the one or more substations, wherein each of the one or more substations executes a respective portion of the computer-executable build instructions, wherein executing a respective portion of the computer-executable build instructions causes each of the one or more substations to perform a build step to build the one or more beverages.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

DETAILED DESCRIPTION

Figure 1A:
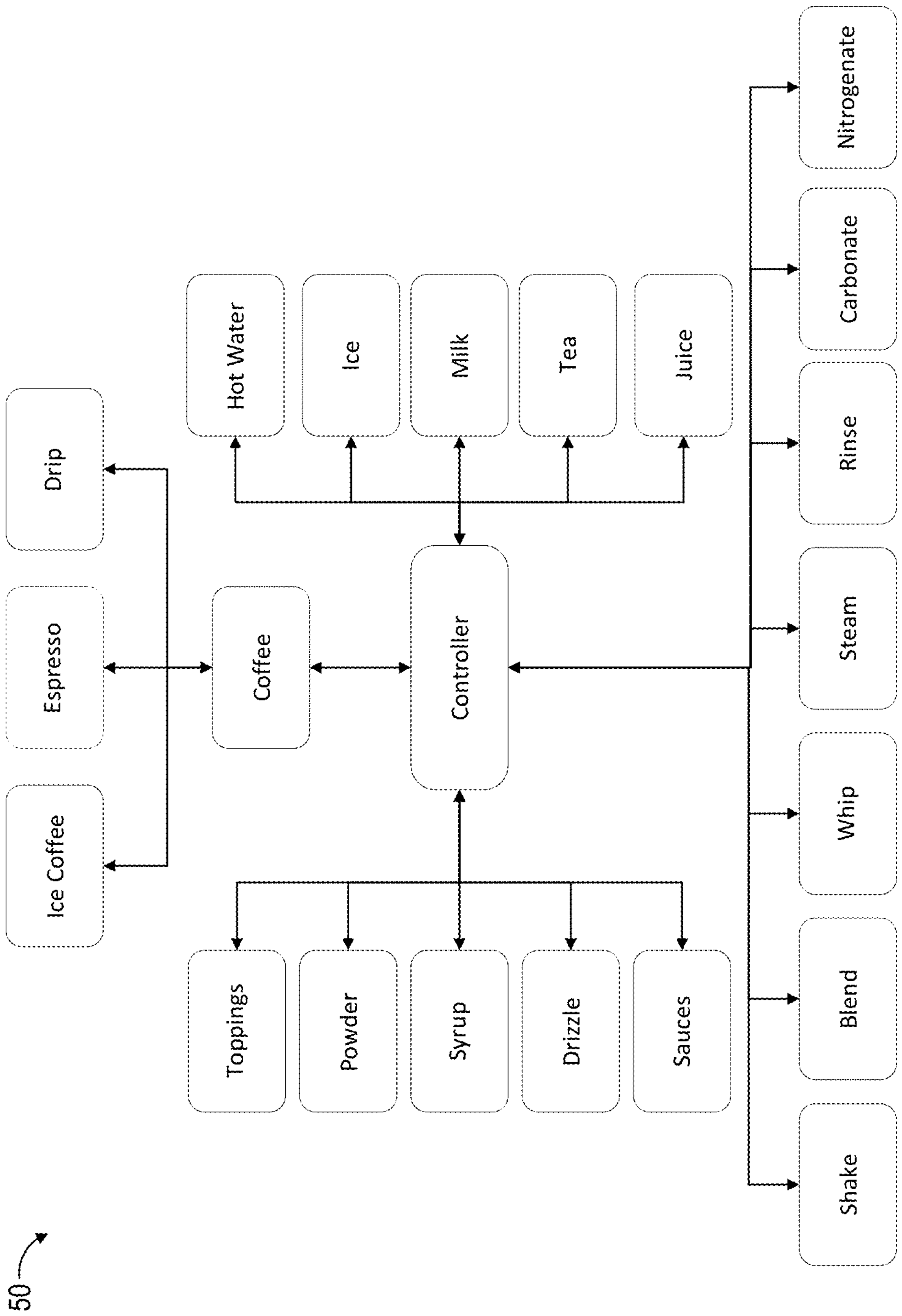
FIG. 1A schematically illustrates an embodiment of a beverage station.

Various extraction systems and methods are described below to illustrate various examples that may achieve one or more desired improvements. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein.

Beverages at a coffee store are often associated with standard (or default) recipes. In general, each standard recipe is a predetermined recipe with specific ingredients and ingredient proportions, designed to yield a particular taste or calorie count, follow a particular dietary restriction, or the like. Conventionally, in response to receiving a beverage order, a barista recollects the recipe from memory and creates the beverage by retrieving ingredients, such as pumping, scooping, or pouring ingredients from their respective containers. In response to receiving multiple beverage orders, a barista can create each drink in sequence, one after the other. In some cases, a barista can prepare multiple drink orders simultaneously, but this can require a barista to coordinate between steps of the multiple drink orders based on memory and equipment availability. This can be further complicated if the drink orders received are customized, requiring a barista to either memorize the customizations or reference the orders, such as on a display or on a receipt. In many cases, relying on the memory of a barista, can often lead to errors or mistakes.

Furthermore, customers often request modifications or customizations to the standard recipe. For example, a customer may want half the sugar and twice the amount of vanilla flavor, as compared to the standard recipe for a particular beverage. This can require precise control of dosing various ingredients. Additionally, ingredient modifications often complicate beverage orders and further exacerbate the burden on baristas. For example, a customer ordering a customized beverage may ultimately receive a beverage with errors or there can be delays in preparing the beverage, which can negatively affect the customer's experience. Additionally, customization can restrict the ability to create a beverage or create beverages simultaneously, particularly as the operational approach and systems may be designed around specific, pre-determined beverage build recipes.

An aspect of the present disclosure, is the recognition that creating customized beverage can be time consuming and complex. Customized beverages can get increasingly complex and burdensome as recipes change, new recipes are added, and more customizations are possible. To alleviate these burdens, customizations can be printed on an order sticker or a receipt for a barista. However, this can be inefficient for operation. Order stickers or receipts are limited in size and shape. Order stickers or receipts can also be limited in what or how they communicate. For example, stickers or receipts can include required inputs or ingredients, but may not be able to convey methods or order of operations.

The process can be labor intensive and can require a lot of space, particularly if the locations for each task or ingredient are spaced apart. Creating a beverage can include collecting and retrieving a variety of ingredients in various locations by hand. Additionally, creating a beverage can require moving a container to various stations to use different equipment. Various steps can take time and space, such as pulling an espresso shot or blending various ingredients.

Not only can these inefficiencies be time consuming, they can also cost more, especially in terms of labor costs. Additionally, baristas can often use excess amounts of ingredients to ensure the cup is full at the end of preparation, which can often lead to waste. As more ingredients and methods are offered, various ingredients or equipment can be positioned far away from each other, which can require baristas to travel long distances between steps and increase production time.

To address these or other concerns, disclosed herein is a system for building collections of build instructions that are grouped as a file (e.g., a sequence file) for customized beverages and controlling a beverage preparation station.

The file can include computer-executable instructions for building customized beverages. The computer-executable instructions can be performed by a plurality of substations to build the customized beverages. In some cases, the file can include multiple subsets or portions of build instructions and the system can assign each subset or portion of the build instructions to a particular subsystem for execution. For example, the system can assign a first portion of the build instructions to a first subsystem for execution and a second portion of the build instructions to a second subsystem for execution.

The system may be a beverage preparation system to prepare one or more beverages. The beverage preparation system can identify, from a queue, one or more drink orders. Each drink order may correspond to one or more beverages. Based on the one or more drink orders, customer data associated with the one or more drink orders, store data, user data, ingredient data, machine data, or any other data associated with the one or more drink orders, the beverage preparation system can dynamically generate computer-executable build instructions for building each of the one or more beverages. Further, the beverage preparation system can identify one more substations. For example, the beverage preparation system can identify one or more substations in a particular store. Each of the one or more substations may correspond to a respective portion of the computer-executable build instructions. For example, the beverage preparation system can dynamically assign a respective portion of a plurality of portions of the computer-executable build instructions to each of the one or more substations for execution.

Based on dynamically assigning a portion of the computer-executable build instructions to each substation, the beverage preparation system can transmit a respective portion of the computer-executable build instructions to each of the one or more substations. Each of the one or more substations can execute a respective portion of the computer-executable build instructions. Execution of a respective portion of the computer-executable build instructions can cause each of the one or more substations to perform a build step to build the one or more beverages. Therefore, the beverage preparation system can build the one or more beverages.

In some cases, to dynamically generate the computer-executable build instructions for building each of the one or more beverages, the beverage preparation system can access a model (e.g., a machine learning model) for dynamically generating build steps for building the one or more beverages. The model may parse data associated with the one or more drink orders. For example, the data may include customer data associated with a customer, step sequence data, step technique data, ingredient data, or other step data. Based on parsing the data, the model can generate the build steps.

In some cases, the beverage preparation system may monitor building of the one or more beverages by the one or more substations. The beverage preparation system can determine a time period for building the one or more beverages based on monitoring the building of the one or more beverages. Further, the beverage preparation system can dynamically update a time period for one or more associated beverages based at least in part on the time period for the one or more beverages.

The beverage preparation station can include a dashboard to show baristas or users what next steps can be taken to build one or more beverages and allow a user to select which one or more drinks to work on. The system can advantageously assist in training baristas or users more quickly while requiring less memorization. This can reduce time required for training, reduce stress during training, and reduce training requirements overall, all while maintaining product quality and without delaying time for beverage production. The system can advantageously allow a user to coordinate various steps of building one or more beverages simultaneously.

The system can provide one or more sequences (e.g., orderings, arrangements, hierarchies, etc.) of one or more beverages and/or food items (e.g., via the dashboard). For example, all or a portion of the one or more sequences can identify a sequence for preparing the one or more beverages and/or food items. The system can enable a user to select (e.g., choose) a sequence of the one or more sequences and may build collections of build instructions based on the selection (e.g., received via the dashboard). In some cases, the system can enable a user to select a sequence from the queue. In other cases, the system can enable a user to select a sequence and the system may define the queue according to the sequence. By enabling a user to select a particular sequence, the system can enable a user to select a sequence of preparing the one or more beverages and/or food items. Further, the system can enable a user to select a particular beverage and/or food items to be prepared at a particular point in the sequence (e.g., first, last, second, third, after or before a particular related beverage and/or food item, etc.). In some cases, the system can enable a user to customize a sequence of the one or more beverages and/or food items (e.g., by defining the sequence based on received user input) and/or can generate a customized sequence based on user input.

In one example, the system can identify orders (e.g., from a queue). For example, the orders may include a first drink order associated with a first customer, a second drink order associated with the first customer, and a third drink order associated with a second customer. The system may receive a selection of a particular order (e.g., the first drink order) to be completed (e.g., fulfilled) first (e.g., prior to other orders of the orders). Based on the section, the system can dynamically generate a sequence of the one or more orders. Further, the system may order the first drink order and the second drink order within the sequence such that the first drink order and the second drink order are completed within a same time period. In some cases, to generate the sequence, the system can access a machine learning model for dynamically generating the sequence. The machine learning model may generate the sequence based on at least one of customer data or store data.

The system can build (e.g., define, generate, etc.) the one or more sequences. The system may include and/or utilize artificial intelligence to build the one or more sequences. In some cases, the system may utilize a machine learning model (e.g., a supervised, unsupervised, reinforcement, etc. machine learning model) to build the one or more sequences. The system may provide data associated with one or more orders, customer data associated with the one or more orders, store data, user data, ingredient data, machine data, or any other data associated with the one or more orders to the machine learning model as an input. Based on the provided input, the machine learning model may output one or more sequences. Further, the machine learning model may be trained using a training data set that includes one or more sequences selected by one or more users and may output the one or more sequences based on the training of the machine learning model.

In one example, the system can build the one or more sequences based on store data identifying how busy the store is at a particular time (e.g., a number of customers in the store, a number of orders in a queue, a number of orders fulfilled within a particular time period (e.g., ten minutes, one hour, etc.), an order rate, etc.). For example, based on store data indicating that the store is busy as compared to the store during other time periods and/or as compared to different stores during the same or different time period, the system can build the one or more sequences for selection.

In some cases, the system can build the one or more sequences based on customer data associated with the one or more beverages and/or food items such that beverages and/or food items associated with the same customer may be ready within a same time period. For example, a customer may order multiple beverages (e.g., a latte, an americano, a cappuccino, etc.) and/or multiple food items (e.g., a bagel with cream cheese, a bagel sandwich, a slice of pumpkin bread, etc.) and the system can generate all or a portion of the one or more sequences such that the multiple beverages and/or multiple food items are ready for pickup and/or handoff to the customer at the same time period regardless of the sequence selected by the user. In some cases, a sequence may include beverages and/or food items associated with the same customer being prepared at different time periods (e.g., initiating preparation of the items at different times) based on the build times for the various items such that the items are ready for pickup and/or handoff to the customer at the same time period.

In some cases, the system can provide the one or more sequences to the user for selection based on provide data associated with one or more orders, customer data associated with the one or more orders, store data, user data, ingredient data, machine data, or any other data associated with the one or more orders. For example, the system can provide the one or more sequences to the user for selection based on how busy the store is at a particular time. Further, the system may provide less sequences for the user to select from if the system determines that the store is comparatively busy as compared to more sequences for the user to select from if the system determines that the store is comparatively not busy. In some cases, the system may determine that the business of the store (e.g., a number of customers in the store, a number of orders in a queue, a number of orders fulfilled within a particular time period (e.g., ten minutes, one hour, etc.), an order rate, etc.) satisfies (e.g., matches, exceeds, etc.) a particular threshold level and based on that determination may preselect a sequence of orders for the user.

In response to a selected sequence of orders and/or a selected order, the system can output the selected sequence of orders and/or the selected order (e.g., via a display). Further, based on a selected sequence (e.g., provided via an input to the system), the system can build a file for the recipes for the selected orders and send corresponding build steps to the appropriate substations. The controller can route at least a portion of the file (e.g., a portion of computer-executable instructions) to each subsystem such that the orders are fulfilled, prepared, etc. and/or the beverages and/or food items and provided to the customer at a particular time.

The beverage preparation station can include one or more substations to dispense various ingredients or execute various actions to build one or more beverages. The beverage preparation station can control substations to automatedly dispense ingredients in precise measurements in accordance with the customized beverage order. The system can not only improve efficiency but also advantageously improve beverage uniformity amongst beverage orders. Furthermore, by automating the dispensing of precise amounts of ingredients, the system advantageously improves beverage quality and consistency. The beverage preparation station can sense manual actions taken at various substations. The beverage preparation station can also track and display steps as they are completed, which can allow the system to predict a time the one or more beverages are to be completed. The beverage preparation station also advantageously eliminates or reduces the need for users to need to memorize drink orders and customizations. This can also reduce confusion and error in coordinating steps in preparing a drink or in preparing multiple drinks. The beverage preparation station allows users to create drink orders with reduced effort and stress, allowing users to multitask in conducting multiple steps and improving speed and efficiency.

In light of the description herein, it will be understood that the embodiments disclosed herein substantially improve beverage quality and efficiency in preparing beverages by partially automating the dispensing of ingredients and/or performing actions for any of thousands or millions of possible ingredient modifications/combinations. Specifically, the embodiments disclosed herein enable a system to receive customized orders, build recipes (including, for example, ingredients, precise amounts of ingredients, and sequence instructions), display build steps to create beverages in accordance with a recipe, facilitate precise and automated dispensing of precise amounts of ingredients in accordance with a recipe, automate performing actions in accordance with a recipe, or sense when manual steps have been taken in accordance with a recipe (including, for example, when a dispensed ingredient has been removed from a substation and when a container has been returned). The ability to build recipes (for example, in real time or near real time) improves beverage quality and consistency by precisely dispensing required amounts of the beverage ingredients in accordance with a recipe; reduces beverage-creation time, as less time is spent by baristas measuring and/or manually dispensing ingredients; and reduces complexity, memorization effort, and training burden, by reducing required recipe memorizations and mentally-performed recipe modifications. The tracking of the amounts of ingredients can also allow the system to calculate nutrition data, including amounts of sugar and/or calories.

The beverage production system can advantageously dispense ingredients from bulk storage, thereby requiring fewer plastic containers or pump assemblies, which advantageously reduces waste in the form of smaller packaging for ingredients, and reduces cleaning time for pumps and assemblies. Furthermore, by automating dispensing and improving precision, the system can improve the ability to determine and track detailed actuals for ingredient consumption, which advantageously reduces manual inventory counting and estimation, thereby improving accuracy in tracking inventory and planning for inventory restocking. The system can also automatically initiate replenishment of ingredients based on the automatic tracking for the inventory. Additionally, the beverage production station can reduce the space required by the various ingredients and equipment by streamlining and optimizing inefficiencies to create a smaller footprint, which advantageously allows users to operate more efficiently by requiring less travel between substations.

Lastly, the beverage production system can allow users to not only operate efficiently but also more accurately. Users can complete multiple steps of a drink order simultaneously or build multiple drinks simultaneously as less time is spent by users in memorizing orders, coordinating and keeping track of steps mentally, and manually measuring ingredients. With assistance from the beverage production system, while waiting for a build step to be executed, the user can jump to other steps. For example, if a longer build step is being executed (e.g., an espresso is being pulled, milk is steaming, or ingredients are blending), the beverage production system can show other build steps (e.g. adding an ingredient) available to work on while waiting for the build step to be completed during the wait time. The beverage production system can also determine if each build step requires a predecessor prior to displaying or allowing execution of the build step, thus preventing errors by the user. Each build step can be tracked and recorded to allow the system to keep track of the steps to build the one or more drink orders correctly and efficiently. Additionally, the beverage production system can reduce the physical strain on the user in reducing requirements for bending, walking, or even reaching.

Although various steps can be automated to assist a user, the beverage production system still permits the art of human crafting to create a beverage. This allows human touches that automated machines cannot perform to be incorporated into drinks, such as latte art, whip cream topping, or sprinkle or drizzle toppings. Additionally, the beverage production system allows for human input in deciding which beverages to create and which steps to take, which can allow beverages to be made quickly and also accommodate the complexity of the customizations.

Many of the embodiments described herein involve a customizable beverage, such as an espresso-based beverage, a blended beverage, a hot beverage, a cold beverage, a coffee beverage, or a tea beverage. However, it should be appreciated that certain features and aspects of the embodiments disclosed herein may be applicable to various types of beverages. Further, it should be appreciated that certain features and aspects of the embodiments disclosed herein may be applicable to various types of foods.

FIG. 1A schematically illustrates an embodiment of a beverage preparation system or station 50. The beverage preparation station 50 can include a variety of substations that create and/or dispense ingredients. The beverage preparation station 50 can include a variety of substations that facilitate or actuate performance of an action to ingredients.

The one or more substations can be controlled from, or by, one or more controllers. For example, the individual substations may be controlled from, or by, a single centralized controller that supplies power and control signals (which may include data or other information, such as build steps in accordance with drink orders) to each of the one or more substations. In other configurations, each substation may be controlled by its own dedicated local controller or subgroups of dispensers may be controlled by a controller.

The one or more substations that dispense ingredients can automatically dispense the correct amount of ingredients in accordance with the recipes and based on the received build step at the corresponding substation. Each substation can act as individualized modules that receive parameterized information or instructions, prepare the ingredient accordingly, dispense the ingredient in the precise amount, and send a signal to the controller that the step has been completed. Each substation can be changed or adapted to dispense any ingredient by changing certain dispensing parameters.

The one or more substations can perform an action in accordance with the recipes and based on the received build step at the corresponding substation. Each substation can act as individualized modules that receive parameterized information or instructions, activate a piece of equipment accordingly, perform the action, and send a signal to the controller that the step has been completed.

The beverage preparation station 50 can include one or more coffee machines to produce and/or dispense various types of coffee, such as espresso, iced coffee, drip coffee, cold brew coffee, cold brew espresso, cold brew, and nitro coffee. These one or more machines can include: an espresso machine, a coffee brewer, a cold brewer, an iced coffee dispenser, or a nitro tap. For example, as shown in FIG. 1, the beverage preparation station 50 can include one or more apparatuses to produce and/or dispense iced coffee, espresso, and drip coffee.

The beverage preparation station 50 can include one or more substations that produce and/or dispense various ingredients, such as hot water, ice, milk, tea, or juice. In some examples, one or more substations can produce or dispense bases for beverages, such as Frappuccino bases. For example, the beverage preparation station 50 can include a substation that includes a hot water heater that heats water and dispenses hot water. For example, the beverage preparation station 50 can include a substation that includes an ice machine that forms and dispenses ice. For example, the beverage preparation station 50 can include containers that are configured to hold and dispense various ingredients, such as various types of milk, juice, or tea. In some embodiments, these containers can be refrigerated or insulated. In some embodiments, these containers can be heated or insulated. For example, the beverage preparation station 50 can include a substation that includes a tea brewer that produces tea and dispenses tea. As previously described, the one or more substations can be connected to bulk storage.

The beverage preparation station 50 can include one or more substations that dispense various ingredients, such as inclusions or modifiers. For example, the beverage preparation station 50 can include one or more substations that dispense toppings, powders, syrup, drizzle, sauces, or other flavorings. For example, these can include sprinkles, spices, candy, shavings, or whip cream.

The beverage preparation station 50 can also include one or more substations that store or dispense cups or lids. The beverage preparation station 50 can also include one or more substations that print drink orders or recipes, such as stickers or receipts.

The beverage preparation station 50 can include one or more substations that provide equipment to perform an action. For example, the beverage preparation station 50 can include one or more substations that allow for heating, blending, whipping, shaking, foaming, steaming, shaking, carbonating, or nitrogenating ingredients. For example, the beverage preparation station 50 can include a heater, a shaker, a blender, a whip cream dispenser, a steam wand, a steamer, or a frother. For example, the beverage preparation station can include a substation that allows for rinsing and/or drying, such as a rinser or dryer. For example, the beverage preparation station 50 can include a substation that allows for carbonating or nitrogenating, such as a machine to add carbonation, nitrogen, or other gases to a beverage.

Each individual task or ingredient can be separate substations. Tasks or ingredients can also be grouped into various substations. For example, similar ingredients can be grouped into a single substation. For example, similar toppings, powders, syrup, drizzle, sauces, or other flavorings can be grouped into a single substation. In some embodiments, various milks can be grouped into a single substation. In some examples, ingredients and actions commonly used together can also be grouped into a single substation. For example, ingredients and equipment commonly used to make a blended beverage can be grouped into a single substation.

The beverage preparation station 50 can include a main display or dashboard 52. The main display or dashboard 52 can also display the recipes and any customizations for each beverage order, including any or all steps to build the beverage order such as ingredient portions and parameters. The main display or dashboard 52 can allow a user to modify the drink orders or the queue for the drink orders. The main display or dashboard 52 can display a queue of beverage orders received and ready to be initiated. The main display or dashboard 52 can also display the progress or status of the various beverage orders and/or the build steps for each beverage order. The main display or dashboard 52 can act as a user interface, allowing a select one or more beverage orders to start working on by selecting it on the queue. In some examples, the main display or dashboard 52 can be touchscreen or can have one or more buttons. The user can select several beverage orders to work on in parallel as well as in series. In some examples, the user can work on up to four beverage orders to work on simultaneously or in parallel. This advantageously allows a user to work on multiple beverage orders simultaneously or in parallel and efficiently, without limiting the beverage orders to be built only serially. Moreover, this advantageously allows a user to work on multiple steps simultaneously or in parallel and efficiently move between various steps for a single beverage order or multiple beverage orders. For example, a user can select two espresso-based drinks or blended drinks, which can include lengthy build steps that take time, such as preparing the espresso shots, steaming milk, or blending ingredients. The user can simultaneously select two cold drinks or drip coffee drinks, which can include shorter steps or less steps than other beverage orders. For example, a user can work on shorter steps (e.g., adding ice) while waiting for a length build step (e.g. pulling an espresso) of a single beverage order. The main display or dashboard 52 can also display the recipes and any customizations for each beverage order, including any or all steps to build the beverage order such as ingredient portions and parameters. The main display or dashboard 52 can allow a user to modify the drink orders or the queue for the drink orders.

The beverage preparation station 50 can include a controller to connect the main display or dashboard 52 and the one or more substations. The controller can receive drink orders and any input on the main display or dashboard 52. Based on the received drink orders, the controller can build (e.g., generate) a data object that includes instructions (e.g., computer code, machine-executable instructions, computer-executable instructions, commands, etc.) for building the drink orders. In some cases, the controller can write the computer-executable instructions to a data object. For example, the data object may be a file, a data store, a container, etc. The data object will be referred to herein as a file, however, it will be understood that the controller can build any data object.

The controller can build a file (e.g., a build file, a computer file, etc.) for the recipe for the selected drink orders and send corresponding build steps to the appropriate substations. The controller can route at least a portion of the file (e.g., a portion of computer-executable instructions) to each subsystem. The portion of the file may cause each subsystem to execute a corresponding build step. For example, the controller can cause the substations to dispense ingredients or perform an action in accordance with the drink orders. The controller can also receive information or data from each of the substations, such as a status of the substation or data from the one or more sensors at each of the substations.

In some cases, the controller can dynamically build or generate the file for the recipe for the selected drink orders. To dynamically build or generate the file, the controller may provide the data associated with the drink orders to a machine learning model. The machine learning model may be trained to output build steps based on the data associated with the drink orders. For example, the machine learning model may be provided a set of training data that includes data associated with training drink orders and an expected output (e.g., an expected set of build steps to be implemented via computer-executable instructions to build the training drink orders). In some embodiments, the expected output may include expected computer-executable instructions to build the drink orders. Therefore, the machine learning model can be trained to output build steps or computer-executable instructions based on data associated with the drink orders.

In some embodiments, the controller may provide data associated with a user of the one or more subsystems. For example, the controller may provide data indicating that a user is an experienced user (e.g., five years of experience), an inexperienced user (e.g. between one and five years of experience), a new user (e.g., less than a year of experience), etc. The machine learning model may be trained to output build steps that are customized (e.g., customized build steps, a customized order of build steps, etc.) for a particular user (e.g., different build steps may be provided for an experienced user v. an inexperienced user). In other embodiments, the controller may provide data associated with the subsystems (e.g., data identifying a store (and the systems and/or capabilities associated with the store), data identifying subsystems within a store, etc.). The machine learning model may be trained to output build steps that are customized (e.g., customized build steps, a customized order of build steps, etc.) for a particular store, a particular set of subsystems, etc.

The controller (e.g., the machine learning model as implemented by the controller) can dynamically build the file by parsing data associated with the drink orders. Further, the controller can parse data associated with the drink orders, one or more users for building the drink orders, one or more machines for building the drink orders, one or more customers associated with the drink orders, a sequence of steps for building the drink orders, a technique for building the drink orders, one or more ingredients for building the drink orders, or one or more build steps. For example, the data associated with the drink orders may include customer data identifying a customer, step sequence data identifying a sequence of steps, step technique data identifying a technique, ingredient data identifying one or more ingredients, and step data identifying one or more build steps.

Based on building the file, the beverage preparation station 50 can initiate dispensing customized ingredients and sense actions taken to create customized beverage orders. The beverage preparation station 50 can advantageously allow users to build beverages and keep track of step completed and any updates in real time. This allows the system to calculate the build time for a particular drink. This data can also be recorded and used to better predict build times for drink orders. The data can be recorded to a specific user to better predict build times for specific users. The build times can also be estimated based on the number of user steps taken. The build times can also be estimated based on a comparison of estimated times to complete each of the build steps versus the actual time taken to complete each of the build steps. The beverage preparation station 50 can also advantageously automate some steps, such as dispensing ingredients, allowing a user to produce beverages efficiently and accurately. The beverage preparation station 50 advantageously allows a user to initiate steps and take actions manually, allowing the user to control the order of steps and the timing of steps. This combination of manual and automated steps allows users to decide what steps and what drink orders to complete while building drinks efficiently.

The beverage preparation station 50 can send a portion of the file (e.g., a portion of the computer-executable instructions) to each subsystem. The portion of the file may include computer-executable instructions to cause a subsystem to perform a build step for building the beverage. Further, the portion of the file may include recipe steps, such as ingredient portions and parameters, for selected or active drinks to corresponding substations. The computer-executable instructions may include a command for the corresponding substation. The portion of the file may include computer-executable instructions that, when executed by a subsystem, cause display of the command at a display at the corresponding substation, dispensing of an ingredient in accordance with the beverage order recipe, and/or waiting for a user to take an action which the corresponding substation can sense.

The controller may build one or more files for a plurality of different drink orders, a plurality of different drinks, and/or a plurality of different recipes. For example, the controller may build a first file for a first drink order that corresponds to a cortado and a second file for a second drink order that corresponds to an americano and the first file and the second file may include separate and/or different build steps. Each file may include different build steps for different subsystems. In some cases, a first file and a second file may each include a build step (different build steps) for the same subsystem. For example, a first file for a first drink order that corresponds to a cortado and a second drink order that corresponds to an americano that corresponds to an americano may each include a build step for a particular subsystem to prepare espresso.

In drink preparation systems with one or more subsystems, the number of drink orders pending at a given time may be large (e.g., 10, 15, 20, 30, etc.) and each drink order may correspond to build steps for different subsystems. For example, a first drink order may correspond to a first build step for a first subsystem and a second build step for a second subsystem and a second drink order may correspond to a third build step for the first subsystem and a fourth build step for a third subsystem. Each subsystem can be executing one or more build steps for different drink orders (e.g., simultaneously or iteratively). Therefore, conflicts in execution can occur where multiple drink orders correspond to a build step for a command to be executed by the same subsystem. For example, a subsystem may execute a first command for a first build step for a first drink order during a time period and may not be available for execution of a second command for a second build step for a second drink order during the time period.

To avoid conflicts and/or errors between drink orders, the controller may identify one or more subsystems associated with a file for a drink order. The controller may identify the build steps of the file and determine a subsystem for implementation of each build step. For example, the controller may determine that a file for a drink order includes three build steps and a first subsystem is to implement a first step of the build steps to dispense a particular amount of coffee, a second subsystem is to implement a second step of the build steps to dispense a particular amount of syrup, and a third subsystem is to implement a third step of the build steps to dispense a particular amount of whipping cream.

The controller may send a prompt to each of the subsystems associated with a build step of the file for the drink order (e.g., based on identifying the subsystems). The prompt may request that a particular subsystem indicate whether the subsystem is associated with the implementation of one or more other build steps. For example, the prompt may request that the subsystem indicate whether the subsystem is currently occupied with implementation of a build step, is scheduled to implement a build step (e.g., within a particular time range such as the next five minutes, ten minutes, etc.), and/or has obtained and/or answered another prompt within a particular time range (e.g., 5 to 10 minutes). In some cases, the controller may determine a time period for execution of the build step (e.g., 45 seconds to pull a shot of espresso) and send a prompt to the subsystem requesting that the subsystem indicate whether the subsystem is currently occupied with implementation of another build step and/or is scheduled to implement another build step within the time period for execution of the build step.

In some cases, the prompt may request that a particular subsystem indicate whether the subsystem is able to execute a particular build step. In some embodiments, the file may include a time range for execution of the build step. The time range may be a range between two times (e.g., 3:00 PM ET to 3:02 PM ET), a range after execution of an activity (e.g., three minutes after building the file, receiving the drink order, execution of a prior build step, etc.), etc.

In response to receiving the prompt, a subsystem can determine whether the subsystem (e.g., all or a portion of the resources of a subsystem) is associated (e.g., currently occupied, scheduled to be occupied, received a prompt associated, etc.) with another build step. All or a portion of the subsystems may be associated with a data store (e.g., a queue, a cache, etc.) identifying commands (or the corresponding build steps for execution). The subsystem can examine the data store and determine if the subsystem is associated with another build step. In some cases, the subsystem can determine if the subsystem is associated with another build step based on a status of one or more resources of the subsystem (e.g., if a syrup dispenser is currently dispensing syrup, a coffee brewer is brewing coffee, etc.). If the subsystem includes a single resource (e.g., a single syrup dispenser), the subsystem can determine whether the single resource is associated with another build step. In another example, if the subsystem includes multiple resources (e.g., multiple syrup dispensers), the subsystem can determine whether all or a portion of the multiple resources are associated with another build step. In some cases, the subsystem can determine whether the subsystem is able (e.g., available, capable, etc.) to execute a particular build step (within a particular time range) and generate a response to the prompt based on determining whether the subsystem is able to execute the particular build step.

Based on determining whether the subsystem is associated with another build step, the subsystem can provide a response to the prompt. The response to the prompt may indicate a state of the subsystem (e.g., occupied or nonoccupied). For example, the state of the subsystem may indicate that the subsystem is currently occupied with implementation of the build step, the subsystem is scheduled to be occupied with implementation of the build step (e.g., within a particular time range), the subsystem has received another prompt and/or responded to another prompt (e.g., within a particular time range), etc. Further, the response to the prompt may indicate a time period for which the subsystem is able to implement a particular build step (e.g., 3:01 to 3:03 PM ET).

The controller may receive a response from all or a portion of the subsystems associated with a build step for a file for a drink order. Based on the responses received from each of the subsystems, the controller can determine whether all or a portion of the subsystems are subsystems associated with the implementation of one or more other build steps.

If the controller determines that one or more of the subsystems are associated with a build step for a file for a drink order are associated with implementation of one or more other build steps, the controller may modify the execution of the build steps for the file for the drink order. To modify the execution of the build steps for the file for the drink order, the controller may delay the execution of all or a portion of the build steps. For example, the controller may delay the execution of all or a portion of the build steps for a particular time period (e.g., 10 minutes). The controller may resend prompts to all or a portion of the subsystems associated with a build step after expiration of the delay (e.g., after expiration of a time period). In some cases, the controller may resend prompts to subsystems that previously indicated that the subsystems were associated with implementation of one or more other build steps.

In some cases, the controller may modify the execution of the build steps by identifying a different subsystem for execution of a particular build step. For example, in response to determining that a particular subsystem is associated with implementation of one or more other build steps, the controller may identify a different subsystem capable of implementing the build step and send a prompt to the different subsystem. In some cases, the controller may modify the execution of the build steps by identifying a different build step related to another build step. For example, in response to determining that a build step is assigned to a particular subsystem that is associated with implementation of one or more other build steps, the controller may identify a different build step related to the build step (e.g., preparing dark roast coffee v. preparing lite roast coffee) and can send a command for execution of the different build step to the same and/or different subsystem.

In some cases, the controller may modify the execution of the build steps by delaying execution of particular build steps. Based on the responses to the prompts received from the subsystems, the controller may schedule the execution of the build steps for different times. For example, the controller may schedule the execution of a first build step for a first subsystem that is available during a first time period (e.g., 3:00 PM ET to 3:02 PM ET) for execution during the first time period and the execution of a second build step for a second subsystem that is available during a second time period (e.g., 3:01 PM ET to 3:03 PM ET) for execution during the second time period. In another example, the controller may send commands corresponding to one or more build steps to one or more subsystems and schedule commands corresponding to one or more build steps to be sent to one or more subsystems (or schedule the one or more subsystems to execute the one or more build steps).

If the controller determines that the subsystems associated with a build step for a file for a drink order are not associated with implementation of one or more other build steps based on the responses to the prompts (e.g., each of the subsystems is not associated with implementation of one or more other build steps), the controller may send one or more commands to all or a portion of the subsystems. The one or more commands may cause all or a portion of the subsystems to perform a corresponding build step to fulfill the drink order.

In some cases, all or a portion of the drink orders may be associated with a particular priority. For example, the priority of a drink order may be based on a customer associated with the drink order, a time of receipt of the drink order, a type of the drink order (e.g., an americano with multiple additions, a black coffee with no additions, etc.), an order type of the drink order (e.g., an online order, an in-person order, etc.), etc. In some embodiments, the controller may assign a priority to all or a portion of the drink orders. For example, the controller may assign a priority to all or a portion of the drink orders based on one or more other drink orders (e.g., one or more previous drink orders).

The controller may send an indication of the priority of a drink order with or separate from a prompt to a particular subsystem. Based on the priority of the drink order, the subsystem may determine whether the subsystem is associated with another build step that has a priority that matches or exceeds the priority of the build step.

If the subsystem is not associated with another build step that has a priority that matches or exceeds the priority of the build step, the subsystem may provide a response to the prompt indicating that the subsystem is not occupied with a build step that has a priority that matches or exceeds the priority of the build step. In response to receiving a command associated with a build step that has a priority exceeding or matching a priority of all or a portion of build steps associated with the subsystem, the controller may remove the build steps from a queue (e.g., the controller may implement the command associated with the build step that has a priority exceeding or matching the priority of all or a portion of the build steps).

If the subsystem is associated with another build step that has a priority that matches or exceeds the priority of the build step, the subsystem may provide a response to the prompt indicating that the subsystem is occupied with a build step that has a priority that matches or exceeds the priority of the build step. In response to receiving a response indicating that a build step has a priority less than or matching a priority of all or a portion of build steps associated with the subsystem, the controller may delay execution of a command corresponding to the build step.

Figure 1B:
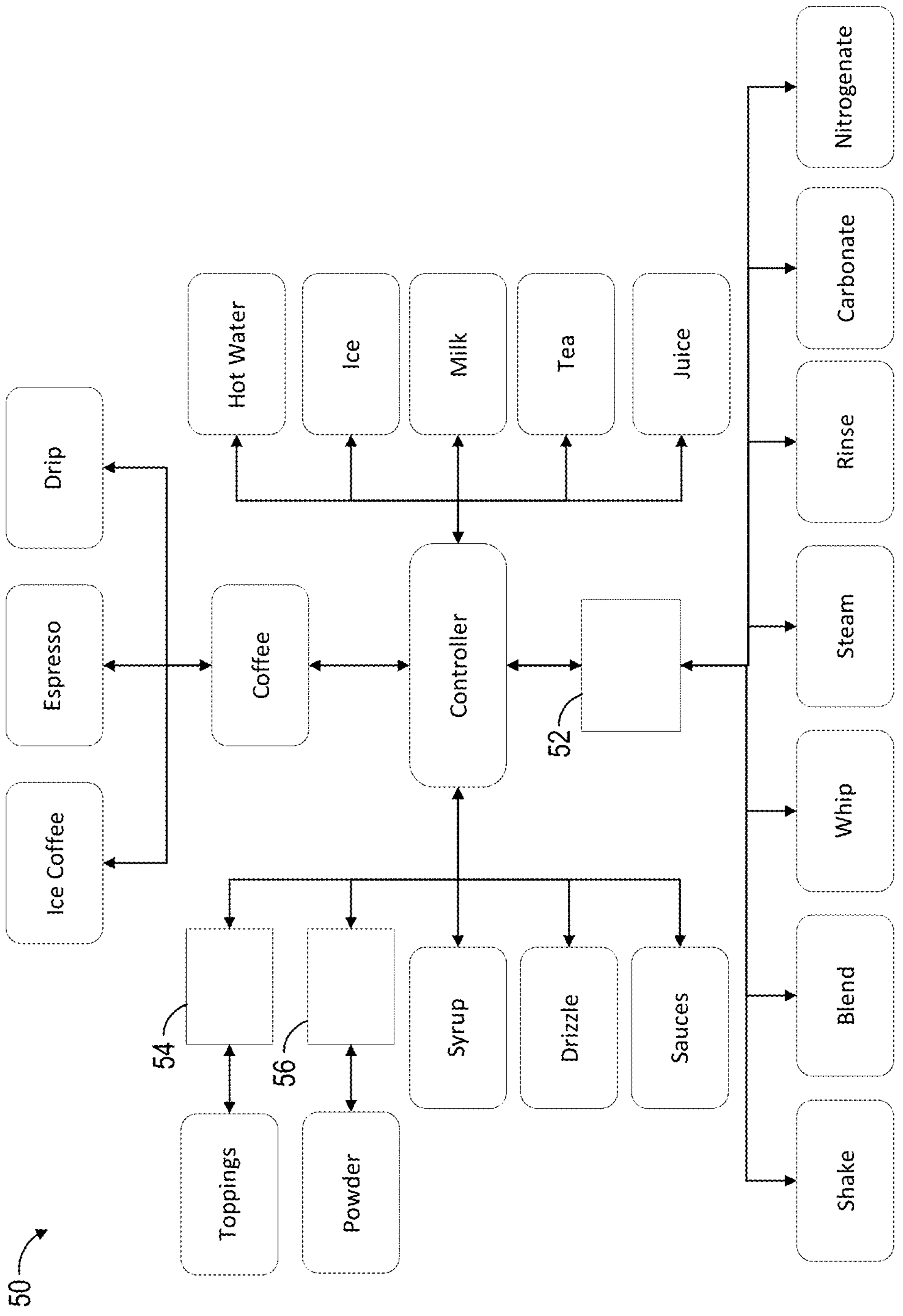
FIG. 1B schematically illustrates another embodiment of a beverage station.

Each substation can include a display or dashboard. The display or dashboard can display the build step received at the corresponding substation. The display can also show an instruction for a user to take to execute a build step. The display can also show a status or progress of the build step at the corresponding substation, such as the substation is waiting to dispense an ingredient or is in the process of preparing an ingredient. The display or dashboard can act as a user interface, allowing a user to select one or more options or build steps. In some examples, the display or dashboard can be touchscreens or can have one or more buttons. In some examples, a user can select a particular build step they want to work on at the corresponding substation. In some examples, a user can update a status of a build step or the build station at the corresponding substation. In some examples, the display for each of the substations can be configured to display the drink or order name associated with the particular build step displayed on the particular substation. Each of the displays of the substations that are building a particular beverage order can be made to look cohesive, such as by displaying the same or similar visual indicators. For example, the associated substations that are associated with build steps for a particular drink could all be the same color or show the same border design. The same or similar visual indicators can be used on the main dashboard for that particular drink. Each of the various substations can include its own display or dashboard. For example, as shown in FIG. 1B, a substation for dispensing toppings can have its own display or dashboard 54 and a substation for dispensing powder can have its own display or dashboard 56.

The interfaces of the main display and/or the displays of one or more substations can be customized based on user preferences, abilities, or experience level. For example, the displays can be configured to hide or group steps for more experienced users. The displays can also be configured to use abbreviations or shorthand based on user preference. Various visual styles can be used based on user preference, such as various contrast, color styles, formatting, and accessibility features.

The substations can include one or more sensors, which can sense when one or more actions are taken at the substation. For example, a substation can include one or more weight sensors, light sensors, pressure sensors, vibration sensors, contact sensors, proximity sensors, magnetic sensors, flow sensors, reed sensors, ultrasonic sensors, or various other types of sensors. The one or more sensors can allow the substation to sense a user's one or more actions. In some embodiments, a substation can be configured to sense when a container or vessel is automatically filled, when the filled container is removed, or when an empty container is returned to the substation. In some embodiments, a substation can be configured to sense when a container is positioned at the substation, when an action at the substation is taken, and when a container has been removed from the substation. In some embodiments, a substation can contain a trigger, such as a paddle or tap switch, and the substation can be configured to sense when the trigger is initiated. In some embodiments, a substation can be configured to sense when a container is removed from the substation or when a container has been returned to the substation.

The beverage preparation station 50 can include displays at each of the substations. Each substation can display a relevant build step or command to create a particular beverage. The substation can display instructions to a user to execute a manual step for a particular beverage order at the substation. The substation can display an ingredient and a measurement that has been dispensed at the substation. The substation can also display a status of the substation.

Figure 2:
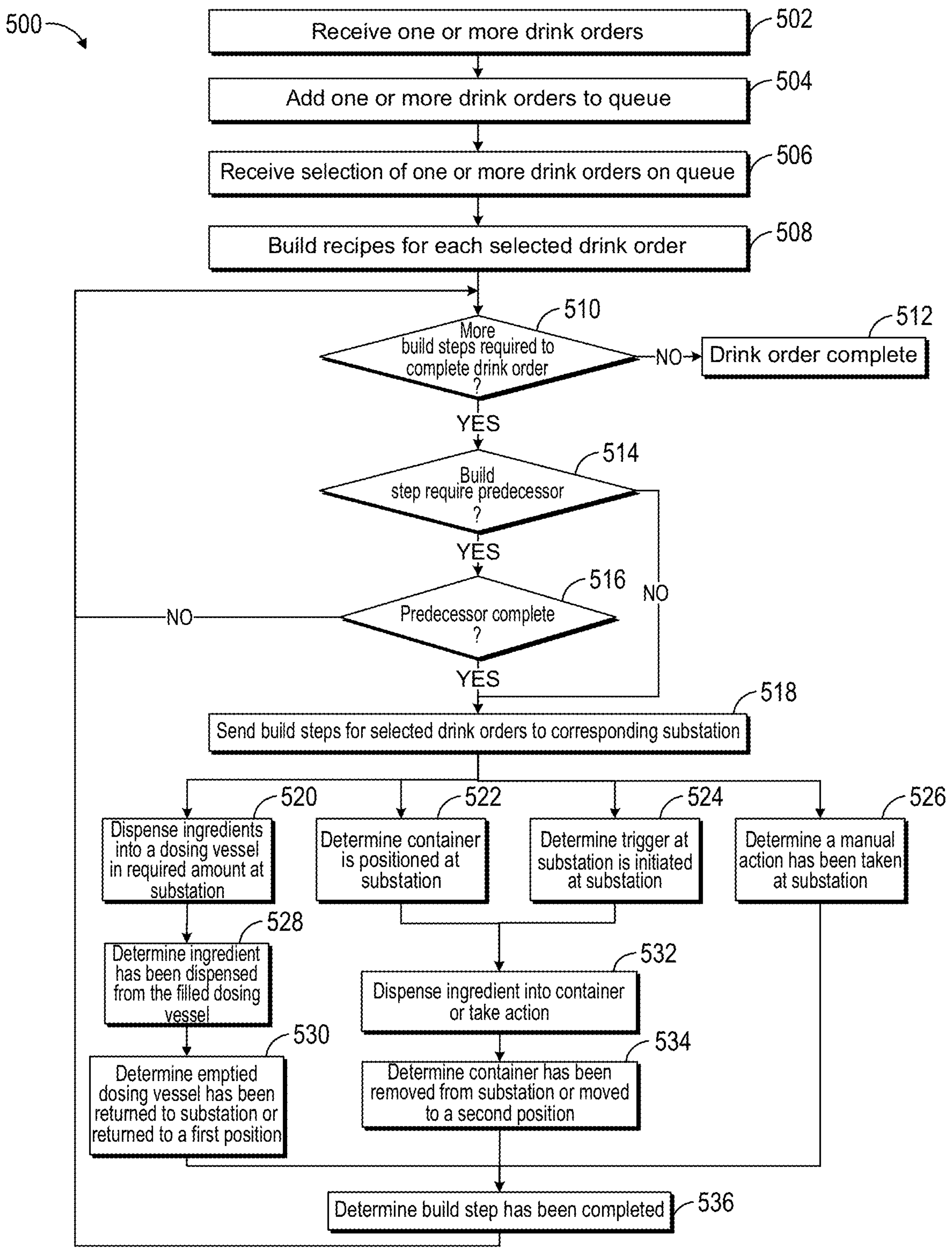
FIG. 2 is a flow diagram illustrative of a method of creating a beverage.

FIG. 2 is a flow diagram illustrative of an embodiment of a method 500 implemented by the beverage preparation station 50 to dynamically assist a user in creating one or more beverages. Although described as being implemented by a controller, it will be understood that the elements outlined for method 500 can be implemented by one or more computing devices or components that are associated with the beverage station 50. Thus, the following illustrative embodiment should not be construed as limiting.

At block 502, the controller receives one or more drink or beverage orders. The one or more drink orders can be received from a plurality of locations, such as through one or more point of service systems in a restaurant or through mobile orders. The one or more drink orders can be customized by customers. Further, the controller can receive the one or more drink orders directly or via a network from one or more computing systems. The controller can receive the one or more drink orders as one or more packets of data. In some cases, the controller can identify metadata associated with the one or more drink orders. For example, the controller can identify a store, a customer, equipment, an employee, inventory, etc. associated with the one or more drink orders. The controller may receive the metadata with the one or more drink orders or separately from the one or more drink orders.

At block 504, the controller adds the one or more drink orders to a queue. For example, the queue may be a digital or virtual queue. To add the one or more drink orders to the queue, the controller can transmit data identifying the one or more drink orders to a computing device and cause display of the drink orders via a display of the computing device based on the data identifying the one or more drink orders. The queue can be displayed on a main display of the beverage station 50. As discussed herein, the beverage preparation station 50 can include a main display or dashboard. The main display or dashboard can also display the progress or status of the various drink orders. The main display or dashboard can also display the various drink orders in the queue that have been received at block 502 and that are ready to be initiated.

At block 506, the controller receives a selection of one or more drink orders on the queue. For example, the controller can receive information identifying a selection of the one or more drink orders on the queue. The main display or dashboard can act as a user interface, allowing a user to select one or more beverage orders to start working on by selecting it on the queue. The user can select several beverage orders to work on simultaneously. In some examples, the user can work on at least two beverage orders to work on simultaneously. In some examples, the user can work on up to four beverage orders to work on simultaneously. This advantageously allows a user to work on multiple beverage orders simultaneously and efficiently, without having to build beverages serially. In some examples, the main display can display the recipes and any customizations for the selected beverage orders, including any or all steps to build the beverage order such as ingredient portions and parameters. In some examples, the main display can receive input from a user to modify the drink orders or the queue for the drink orders.

At block 508, the controller builds recipes for each of the selected drink orders, including any input received from the user or customizations. In some examples, the main display or dashboard can also display the recipes and any customizations for each beverage order, including any or all steps to build the beverage order such as ingredient portions and parameters.

To build the recipes (e.g., the recipes including a plurality of build steps), the controller can dynamically generate any number of build steps to include in each of the recipes. The controller may dynamically generate the build steps to include in the recipes by parameterizing the recipes (e.g., breaking the recipe down into a plurality of parameters that each correspond to one or more build steps). The controller can identify one or more sets of build steps that can be utilized in a recipe to build a drink. In some cases, the controller can select a set of build steps from a plurality of different sets of build steps for building the recipe. The controller may compare each set of build steps and identify a set of build steps that is more environmentally conscious than another set of build steps (e.g., a set of build steps with a carbon output that is lower than another set of build steps), a set of build steps associated with a time period for completion that is lower than another set of build steps, a set of build steps associated with an expertise level for building the drink that is lower than another set of build steps, a set of build steps that uses less, different, or less expensive ingredients than another set of build steps, a set of build steps that uses less, different, or less expensive equipment than another set of build steps, etc.

Based on the recipes, the controller can dynamically build or generate a file. For example, each file may correspond to a given recipe. Further, the controller can dynamically build or generate computer-executable instructions to be included in the file. The computer-executable instructions may cause the execution of the build steps of a particular recipe. The computer-executable instructions may include a plurality of subsets or portions of computer-executable instructions. Each subset or portion of the computer-executable instructions may cause the implementation of a particular build step, the implementation of a predecessor to a particular build step, etc. The controller may dynamically assign each subset or portion of computer-executable instructions to a particular subsystem for execution. For example, the controller may dynamically assign a first portion of computer-executable instructions to a first subsystem that, when executed by the first subsystem, cause the first subsystem to dispense a particular amount of coffee and a second portion of computer-executable instructions to a second subsystem that, when executed by the second subsystem, cause the second system to dispense a particular amount of whipping cream.

In some cases, the controller may identify a pre-built file based on a particular recipe. For example, the controller may identify that the build steps of a recipe correspond to a previously built file. Based on identifying that the build steps of the recipe correspond to the previously built file, the controller may access the previously built file instead of building the file.

At block 510, the controller determines whether each of the recipes for the corresponding selected drink orders require more build steps. For example, the controller can determine whether one or more build steps from a given recipe have not been completed for the building of a particular drink order (e.g., the controller can determine if each build step from a given receipt has been completed). If the answer is no at decision block 510, the method 500 can move to block 512 and the controller determines that the drink order is complete. Based on identifying that the drink order is complete, the controller can modify the queue. For example, the controller can remove the drink order from the queue or modify (e.g., mark on) the queue to indicate that the drink order is complete. If the answer at the decision block 510 is yes, the controller can identify one or more build steps from the recipe for building the drink order that have not been completed and the method can move to block 514.

At decision block 514, the controller determines whether each build step that has not been completed requires a predecessor. For example, the controller can determine whether for any build step that has not been completed, the controller should perform a predecessor step. The controller can determine whether to perform a predecessor step based on the recipe and/or the file. The predecessor step can be any action or step that the recipe and/or the file indicates are to be performed prior to the performance of the build step. In some cases, the predecessor step may be an initializing or preparing step for performance of a build step. For example, the build step may include preparing the espresso and the predecessor step may include grinding the coffee beans for the espresso.

If the answer is no at decision block 514 and the controller does not determine that a predecessor step is to be completed, the method 500 can move to block 518. At block 518, the controller sends the build step for the selected drink order to a corresponding substation (e.g., the substation to which the controller dynamically assigned the build step). For example, the build step for the selected drink order may be to dispense an ingredient, such as a syrup, into a cup. The build step may not require a predecessor, which will move the method 500 to block 518. However, the build step can require a predecessor. For example, the build step may be an action taken, such steaming milk, which can require dispensing an ingredient first, such as dispensing milk into a cup. The controller determining whether a build step requires a predecessor advantageously allows a user to work on multiple steps for one or more drink orders in parallel for steps that do not require a predecessor. In some examples, the build step can be displayed on a display or dashboard at the corresponding substation.

If the answer is yes at decision block 514, the method can move to block 516. At block 516, the controller determines whether the predecessor for the build step is complete. For example, the controller can determine whether each predecessor (e.g., one or more predecessor steps) for a build step has been completed. If the answer is no at decision block 516, the method 500 can return to block 510 and the method 500 can continue. For example, if the build step for the selected drink order is an action taken, such steaming milk, which can require dispensing an ingredient first, such as dispensing milk into a cup. At block 516, if the milk has not yet been dispensed into a cup, the predecessor is not yet complete for the steaming milk build step and the method can return to block 510. If the answer is yes at decision block 516, the method 500 can move to block 518. For example, at block 516, if the milk has been dispensed into a cup, the predecessor is complete for the steaming milk build step and the method can progress to block 518.

At block 518, the controller sends the build step to the corresponding substation. To send the build step to the corresponding substation, the controller can send a portion of computer-executable instructions from the file and corresponding to the build step to the substation dynamically assigned to execute the build step. The execution of the computer-executable instructions by the substation can cause the performance of the build step. Therefore, the controller can cause the performance of the build step. As previously described, the various substations can dispense various types of ingredients and/or perform an action. In some examples, the corresponding substation can display the build step on a display at the substation.

Depending on the build step and the corresponding substation, the substation can take a plurality of one or more actions. Each substation can be controlled by the controller to dispense a precise amount of the respective ingredient or perform an action in accordance with the drink order.

At block 520, the substation can dispense an ingredient into a dosing vessel in the required amount in accordance with the build step. For example, if the build step is to add an ingredient to the beverage, the controller can dynamically assign the build step to the corresponding substation that dispenses the appropriate ingredient and send computer-executable instructions that cause performance of the build step to the corresponding substation. For example, the build step may be to add ice to the beverage. The controller can dynamically assign the build step to the substation that contains the ice maker and/or the ice dispenser, the controller can send corresponding computer-executable instructions to the substation, and the substation can execute (e.g., automatically execute) the computer-executable instructions which can cause the substation to automatically dispense the desired amount of ice into a dosing vessel. In another example, the build step may be to add a powder to the beverage. The controller can dynamically assign the build step to the substation that contains powders, the controller can send corresponding computer-executable instructions to the substation, and the substation execute the computer-executable instructions which can cause the substation to automatically dispense a precise amount of powder into a dosing vessel. In some examples, the controller can determine if the dosing vessel is in a first position to receive the ingredient before dispensing the ingredient. For example, the first position configured to receive a dispensed ingredient can be an upright position. The method 500 can then proceed to block 528.

At block 528, the substation can determine the ingredient has been dispensed from the dosing vessel. For example, the substation can determine the filled dosing vessel has been removed from the substation. In another example, the substation can determine the filled dosing vessel has been moved to a position for dispensing, such as tilted, rotated, or inverted. As discussed herein, each of the substations can include one or more sensors, which can sense when one or more actions are taken at the substation. For example, a substation can include one or more weight sensors, light sensors, pressure sensors, vibration sensors, contact sensors, or various other types of sensors. The substation determine the filled dosing vessel is removed from the substation or moved to different positions based on the one or more sensors. For example, the substation can receive sensor data from the one or more sensors. The substation can parse the sensor data to identify when the dosing vessel is present or is not present or can determine what position the dosing vessel is in. For example, the substation can associate a particular subset of sensor data (e.g., particular data from a contact sensor) to indicate the presence of the dosing vessel and a different subset of sensor data to indicate the removal of the dosing vessel. The user can then empty the filled dosing vessel into a container to add the ingredient to the beverage. For example, the substation can associate a particular subset of sensor data (e.g., particular data from a contact sensor) to indicate the dosing vessel is in a first position and a different subset of sensor data to indicate the dosing vessel is in a second position. In some examples, the dosing vessel can be part of or attached to the substation and can be moved to different positions, such as during filling, executing an action, dispensing, or cleaning. For example, the container may be positioned or oriented in a first position. The container can be filled with an ingredient in the first position. The container can then be positioned or oriented in a second position, such as being rotated or tilted or inverted, to dispense the ingredient from the container. The container, once emptied, can be then returned or reset to the first position at the substation. The method 500 can then proceed to block 530.

At block 530, the substation can determine the container has been returned to the substation or reset to the first position configured to receive a dispensed ingredient. For example, after the user has transferred the ingredients from the dosing vessel to the beverage at block 528, the user can return the emptied dosing vessel to the substation. The substation can determine the emptied dosing vessel has been returned to the substation based on sensor data received by the substation from the one or more sensors. For example, after the container has been dispensed in a second position (such as tilted, rotated, or inverted), the container can be returned to a first position. The method 500 can then proceed to block 536.

At block 536, the controller determines the build step has been completed. In some examples, the substation can determine the build step has been completed once it has been determined that the ingredients have been dispensed into a dosing vessel in the required amount at block 520, the ingredient has been dispensed from the filled dosing vessel at block 528, and the emptied dosing vessel has been returned to the substation or returned to a first position at block 530. Further, the substation can route information to the controller indicating that the substation completed the build step. The method can then return to block 510 and the method 500 can continue with the performance of additional build steps or the completion of the building of the beverage.

At block 522, the substation can determine whether a container is positioned at the substation or whether the container has been positioned in a first position. The first position can be a position such that the container is configured to receive an ingredient, such as an upright position. If the build step is to add an ingredient to a container, the controller can send computer-executable instructions corresponding to the build step to the corresponding substation. Execution of the computer-executable instructions can cause the corresponding substation to dispense the appropriate ingredient in a container. The execution of the computer-executable instructions, or separate computer-executable instructions associated with the substation, may cause the substation to detect when a container has been positioned at the substation. In some examples, the substation can determine a container is positioned at the substation or positioned in the first position based on the one or more sensors. For example, the build step may be to add an espresso shot to a beverage. The build step can be sent to the substation that contains the espresso machine and the substation can determine a container, such as an espresso cup, has been positioned at the substation or positioned in the first position based on the one or more sensors. In some embodiments, the substation can determine the espresso cup has been positioned underneath a dispensing point of the espresso machine at the substation. In another example, the build step may be to steam milk. The build step can be sent to the substation that contains the steamer and the substation can determine a container, such as a pitcher, has been positioned at the substation based on the one or more sensors. In some embodiments, the substation can determine the pitcher has been positioned underneath a steaming wand. In some examples, the container can be part of or attached to the substation and can be moved to different positions, such as during filling, executing an action, dispensing, or cleaning. For example, the container may be positioned or oriented in a first position. The container can be filled in the first position. The container can then be positioned or oriented in a second position, such as being rotated or tilted or inverted, to dispense the ingredient from the container. The container, once emptied, can be then returned or reset to the first position at the substation. The method can then proceed to block 532.

At block 532, based on determining the container is positioned at the substation or positioned in the first position, the substation can dispense the ingredient into the container in the required amount in accordance with the build step or take an action in accordance with the build step. For example, the substation can perform or assist in the performance of actions including heating, blending, whipping, shaking, foaming, or steaming ingredients. Further, the one or more substations can include a heater, a blender, a whip cream dispenser, a steam wand, a steamer, or a frother. In some examples, the one or more substations can include equipment that allows for rinsing and/or drying, such as a rinser or dryer. For example, if the build step is to add a shot of espresso to a beverage, the substation can automatically initiate the pulling of the espresso shot into the espresso cup positioned at the substation. In another example, if the build step is to steam milk, the substation can initiate steaming milk in the pitcher positioned underneath the steaming wand.

At block 534, the substation can determine the container has been removed from the substation or positioned in a second position, different from the first position. For example, once the ingredient has been dispensed or the action has been taken, the container can be removed from the substation (e.g., by an automated device, by a user, etc.) or the container can be moved to a second position. In another example, once an ingredient is dispensed or once an action is taken (such as heating, blending, whipping, shaking, foaming, steaming, rinsing, or drying), the container can then be removed from the substation or moved to a second position. The substation can determine when the container has been removed from the substation or moved into a second position based on sensor data from the one or more sensors. In some examples, the user can then empty the container to add the ingredient to the beverage. For example, the substation can determine the filled espresso cup has been removed from the substation or moved into a second position, and the user can then add the espresso to the beverage. In another example, the substation can determine the pitcher of steamed milk has been removed from the substation or moved into a second position, and the user can then add the steamed milk to the beverage. In some examples, the container can be rotated, tilted, or inverted from the first position to the second position. The second position can be configured to dispense the ingredient from the container into the beverage. In some embodiments, the container at the substation may be the container for the beverage. For example, the container positioned at the substation at block 522 may be the final container to present the beverage in. As such, the substation at block 532 can dispense the ingredient or perform an action on the ingredients in the final container. Therefore, the substation can determine the final container has been removed from the substation based on the one or more sensors. The method can then proceed to block 536.

At block 536, the controller can determine the build step has been completed. In some examples, the substation can determine the build step has been completed once it has been determined that the container was positioned at the substation at block 522, the ingredient was dispensed into the container or an action was taken at block 532, and the container has been removed from the substation at block 534 or moved into a second position. As discussed above, the substation can route an indication of completion of the build step to the controller. The method can then return to block 510 and the method 500 can continue.

At block 524, the substation can determine that a trigger at substation is initiated. In some examples, the trigger can be a paddle, a tap, a switch, or a button. The initiation of the trigger may cause data indicating that the trigger has been initiated. In one example, if the build step is to add an ingredient to a container, the controller can route computer-executable instructions to cause the execution of the build step to the corresponding substation that dispenses the appropriate ingredient. The substation may include a trigger that is utilized in the process of executing the build step. The substation can then determine when a trigger at the substation is activated or triggered.

In some examples, the initiation of the trigger can cause an ingredient to be dispended at the substation. In some examples, the initiation of the trigger can cause the initiation of an action. For example, the initiation of the trigger can cause the substation to perform or activate heating, blending, whipping, shaking, foaming, or steaming ingredients. For example, the one or more substations can include a heater, a blender, a whip cream dispenser, a steam wand, a steamer, or a frother. For example, the one or more substations can include equipment that allows for rinsing and/or drying, such as a rinser or dryer. For example, the build step may be to add a tea or juice to a beverage. The build step can be sent to the substation that contains the tea or juice dispenser and the substation can determine a trigger has been activated, such as a tap being flipped. In another example, the build step may be to add water, syrup, cold coffee, or other ingredients to the beverage. In some examples, the build step may be to take an action, such as blending one or more ingredients. The build step can be sent to a substation that contains the blending mechanism and the substation can determine a trigger has been activated, such as a button has been pushed. The method can then proceed to block 532.

As discussed above, at block 532, based on determining that the trigger at the substation is initiated, the substation can dispense the ingredient or take an action. In some embodiments, the substation can dispense the ingredient in the desired amount in accordance with the beverage order recipe. In some embodiments, the substation can dispense the ingredient for as long as the user activates the trigger, such as flipping the switch. For example, the substation can dispense the ingredient while the trigger is activated. Therefore, the user can control the amount of ingredient dispensed based on activation of the trigger. In some embodiments, the substation can take an action in accordance with the build step. In some embodiments, the substation can perform an action for a period of time in accordance with the beverage order recipe. In some embodiments, the substation can perform an action for as long as the user activates the trigger, such as flipping the switch. The user can then control the action based on activation of the trigger. For example, the substation can initiate blending of one or more ingredients. In some embodiments, the substation can blend the one or more ingredients for a predetermined amount of time in accordance with the beverage order. In other embodiments, the substation can blend the one or more ingredients for as long as the user activates the trigger, such as pushing a button.

As discussed above, at block 534, the substation can determine the container has been removed from the substation or moved into a second position. For example, once the ingredient has been dispensed or the action has been taken, the container can be removed from the substation or be moved into a second position. The substation can determine when the container has been removed from the substation or moved into a second position based on sensor data received from the one or more sensors. The user can then dispense the container into a container to add the ingredient to the beverage. For example, the substation can determine the filled container holding juice or tea has been removed from the substation or moved into a second position, and the user can then add the juice or tea to the beverage. In another example, the substation can determine the pitcher of blended ingredients have been removed from the substation or moved into a second position, and the user can then add the blended ingredients to the beverage. In some examples, the container can be rotated, tilted, or inverted from the first position to the second position. In some examples, the second position can be a position configured to dispense the ingredient from the container for the beverage. In some embodiments, the container at the substation may be the container for the beverage. For example, the container positioned at the substation at block 524 when the trigger is initiated may be the final container to present the beverage in. As such, the substation at block 532 can dispense the ingredient or perform an action on the ingredients in the final container. At block 534, the substation can determine the final container has been removed from the substation based on the one or more sensors. The method can then proceed to block 536.

As discussed above, at block 536, the controller can determine the build step has been completed. In some examples, the substation can determine the build step has been completed once it has been determined that the trigger at the substation was initiated at block 524, the ingredient was dispensed into the container or an action was taken at block 532, and the container has been removed from the substation at block 534. The method can then return to block 510 and the method 500 can continue.

At block 526, the substation can determine a manual action has been taken at the substation. If the build step is to add an ingredient to a container, the controller can transmit computer-executable instructions to the substation that cause performance of the build step by the corresponding substation that has been dynamically assigned to the build step (e.g., based on the controller determining that the substation contains the appropriate ingredient). The substation can determine when a manual action is taken. For example, the build step may be to add a drizzle, a topping, or a whipped ingredient to a beverage. The controller can send computer-executable instructions for the performance of the build step to the substation that contains the corresponding ingredient. The substation can determine when the container for the desired ingredient has been removed from the substation or moved to a second position. In some examples, the substation can determine the container for the desired ingredient has been removed from the station or moved to a second position based on sensor data received from the one or more sensors. The user can then use the container to dispense the desired ingredient into the drink, such as applying the drizzle, adding the topping, or adding the whipped ingredient to the beverage. In some examples, the container can be rotated, tilted, or inverted from the first position to the second position. In the second position, the container can be in a position configured to dispense the ingredient for the beverage. The substation can then determine that the container has been returned to the substation or returned to the first position. In some examples, the substation can determine the container has been returned to the substation or returned to the first position based on sensor data received from the one or more sensors. Furthermore, the substation can determine how much of the desired ingredient has been dispensed such as based on the time the container was removed from the substation or moved to the second position or the difference in the weight of the container. The method can then proceed to block 536. As discussed above, at block 536, the controller can determine the build step has been completed. In some examples, the substation can determine the build step has been completed once it has been determined a manual action was taken. The method can then return to block 510 and the method 500 can continue.

In some embodiments, the substation can determine a build step cannot be completed due to an error. For example, a substation can be out of a certain ingredient, a substation can have a clog along a dispensing line, a substation can have a power issue, a substation can be missing a container (such as a dosing vessel). If a substation determines a build step cannot be completed due to an error, a dashboard (such as the main dashboard or a dashboard of the particular substation) can display an error has occurred and the substation can be prevented from further executing any related steps for the particular build step.

Figure 3:
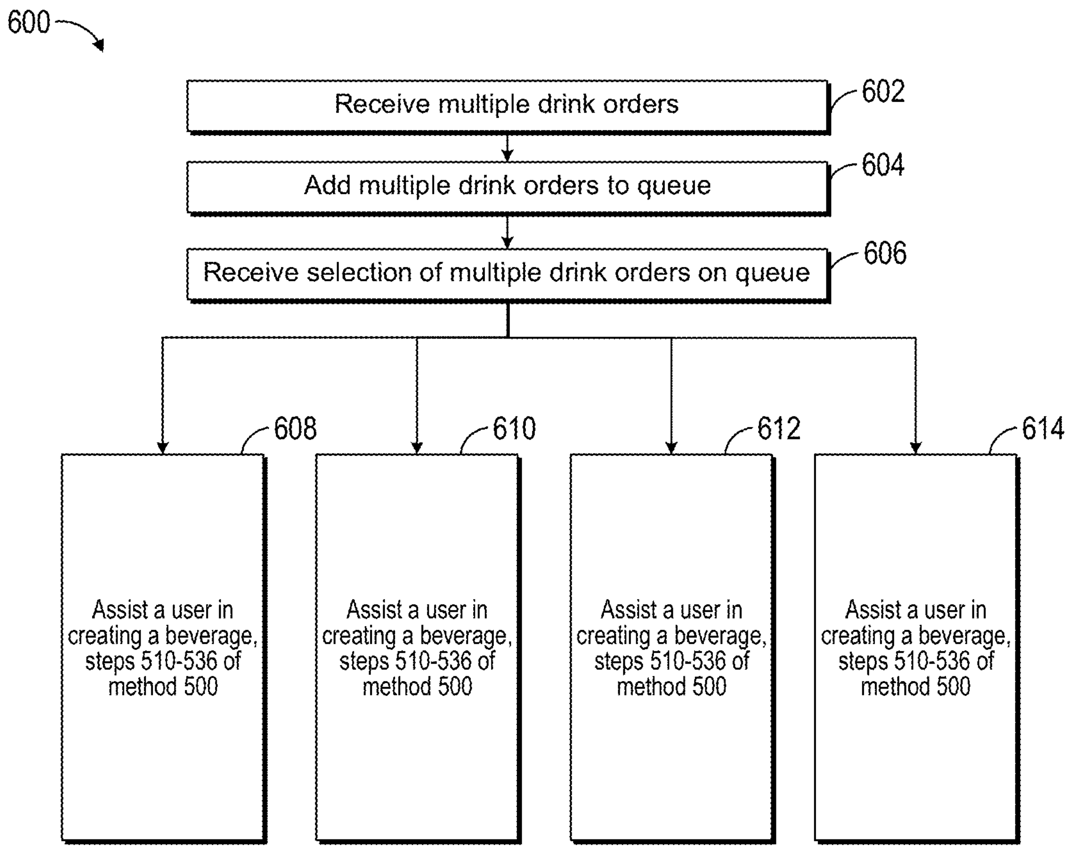
FIG. 3 is a flow diagram illustrative of a method of creating multiple beverages.

FIG. 3 is a flow diagram illustrative of an embodiment of a method 600 implemented by the beverage preparation station 50 to dynamically assist a user in creating multiple beverages. Although described as being implemented by a controller, it will be understood that the elements outlined for method 600 can be implemented by one or more computing devices or components that are associated with the beverage station 50. Thus, the following illustrative embodiment should not be construed as limiting.

At block 602, the controller receives multiple drink or beverage orders. The multiple drink orders can be received from a plurality of locations, such as through one or more point of service systems in a restaurant or through mobile orders. The one or more drink orders can be customized by customers. Further, the controller can receive the multiple drink orders directly or via a network from one or more computing systems. The controller can receive the multiple drink orders as one or more packets of data. In some cases, the controller can identify metadata associated with the multiple drink orders. For example, the controller can identify a store, a customer, equipment, an employee, inventory, etc. associated with the one or more drink orders. The controller may receive the metadata with the multiple drink orders or separately from the multiple orders.

At block 604, the controller adds the multiple drink orders to a queue. For example, the queue may be a digital or virtual queue. To add the multiple drink orders to the queue, the controller can transmit data identifying the multiple drink orders to a computing device and cause display of the drink orders via a display of the computing device based on the data identifying the multiple drink orders. The queue can be displayed on a main display of the beverage station 50. As discussed herein, the beverage preparation station 50 can include a main display or dashboard. The main display or dashboard can also display the progress or status of the multiple drink orders. The main display or dashboard can also display the multiple drink orders in the queue that have been received at block 602 and that are ready to be initiated.

At block 606, the controller receives a selection of multiple drink orders on the queue. For example, the controller can receive information identifying a selection of multiple drink orders on the queue. The main display or dashboard can act as a user interface, allowing a user to select multiple beverage orders to start working on simultaneously by selecting it on the queue. The user can select multiple beverage orders to work on simultaneously. In some examples, the user can work on at least two beverage orders to work on simultaneously. In some examples, the user can work on up to four beverage orders to work on simultaneously. This advantageously allows a user to work on multiple beverage orders simultaneously and efficiently, without having to build beverages serially. In some examples, the main display can display the recipes and any customizations for the selected multiple beverage orders, including any or all steps to build the beverage order such as ingredient portions and parameters. In some examples, the main display can receive input from a user to modify the drink orders or the queue for the multiple drink orders. The main display or dashboard can display the multiple drink orders in the queue that have been selected at block 606.

At blocks 608-614, the controller can assist a user in creating multiple beverage orders simultaneously, such as in parallel. The controller can move through blocks 510-536 of method 500 as previously described for each beverage simultaneously. These steps 510-536 for each of the multiple beverages can be performed simultaneously. This advantageously allows a user to work on multiple beverage orders simultaneously or in parallel and efficiently, without limiting the beverage orders to be built only serially. Moreover, this advantageously allows a user to work on multiple steps simultaneously or in parallel and efficiently move between various steps for a single beverage order or multiple beverage orders. For example, a user can select two espresso-based drinks or blended drinks, which can include lengthy build steps that take time, such as preparing the espresso shots, steaming milk, or blending ingredients. The user can simultaneously select two cold drinks or drip coffee drinks, which can include shorter steps or less steps than other beverage orders. The user can work on shorter steps (e.g., adding ice) while waiting for a lengthy build step (e.g. pulling an espresso) of multiple beverage orders. The controller does not necessarily move through blocks 510-536 for each beverage at the same pace, such that each of the multiple beverages are not started or finished at the same time. Rather, a user can decide which steps to jump between among the multiple beverage orders to create multiple beverage orders simultaneously. Additionally, a user can select to start an additional beverage when already working on one or more beverage orders.

Figure 4:
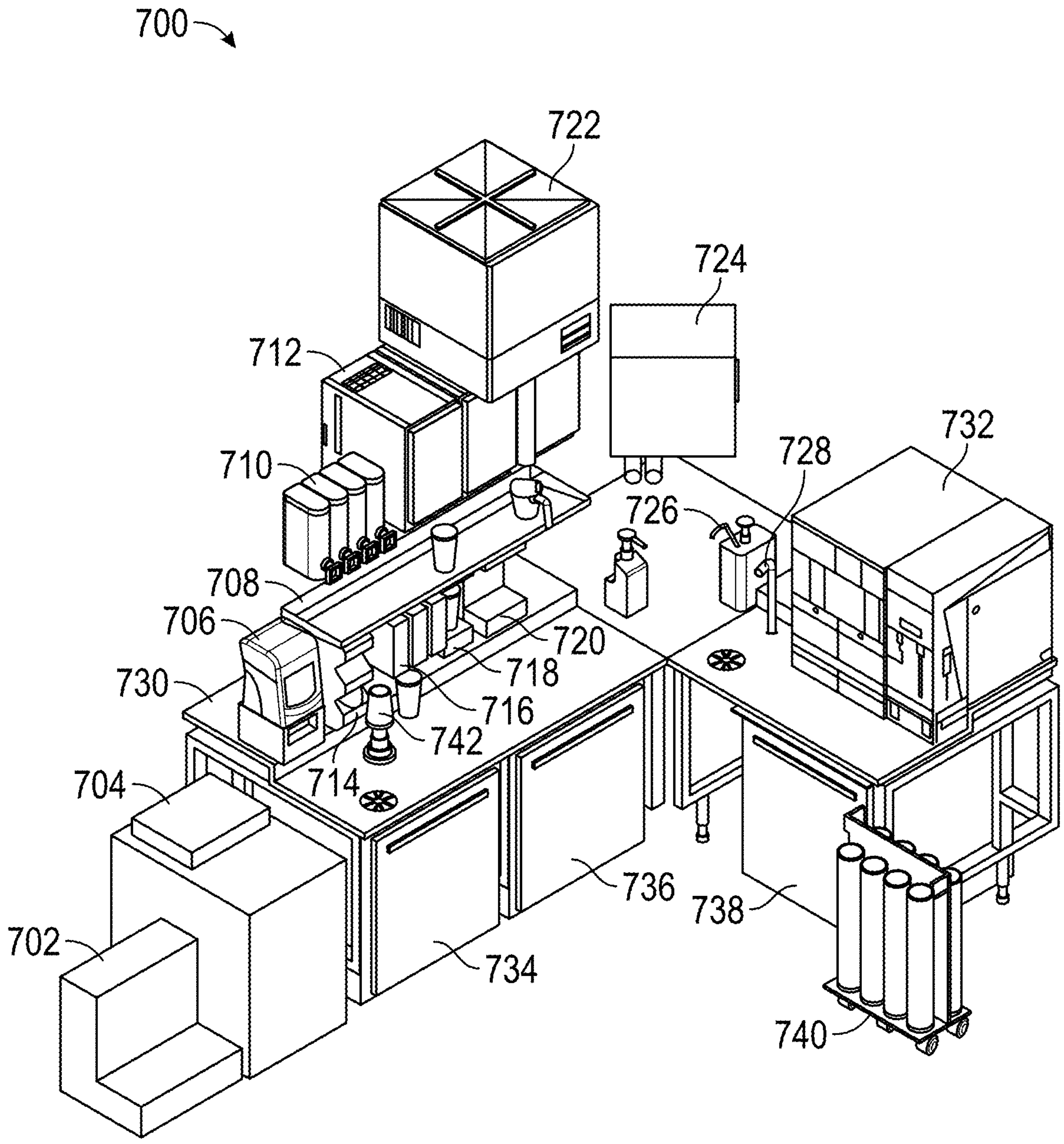
FIG. 4 illustrates an embodiment of a beverage preparation system or station.
Figure 5:
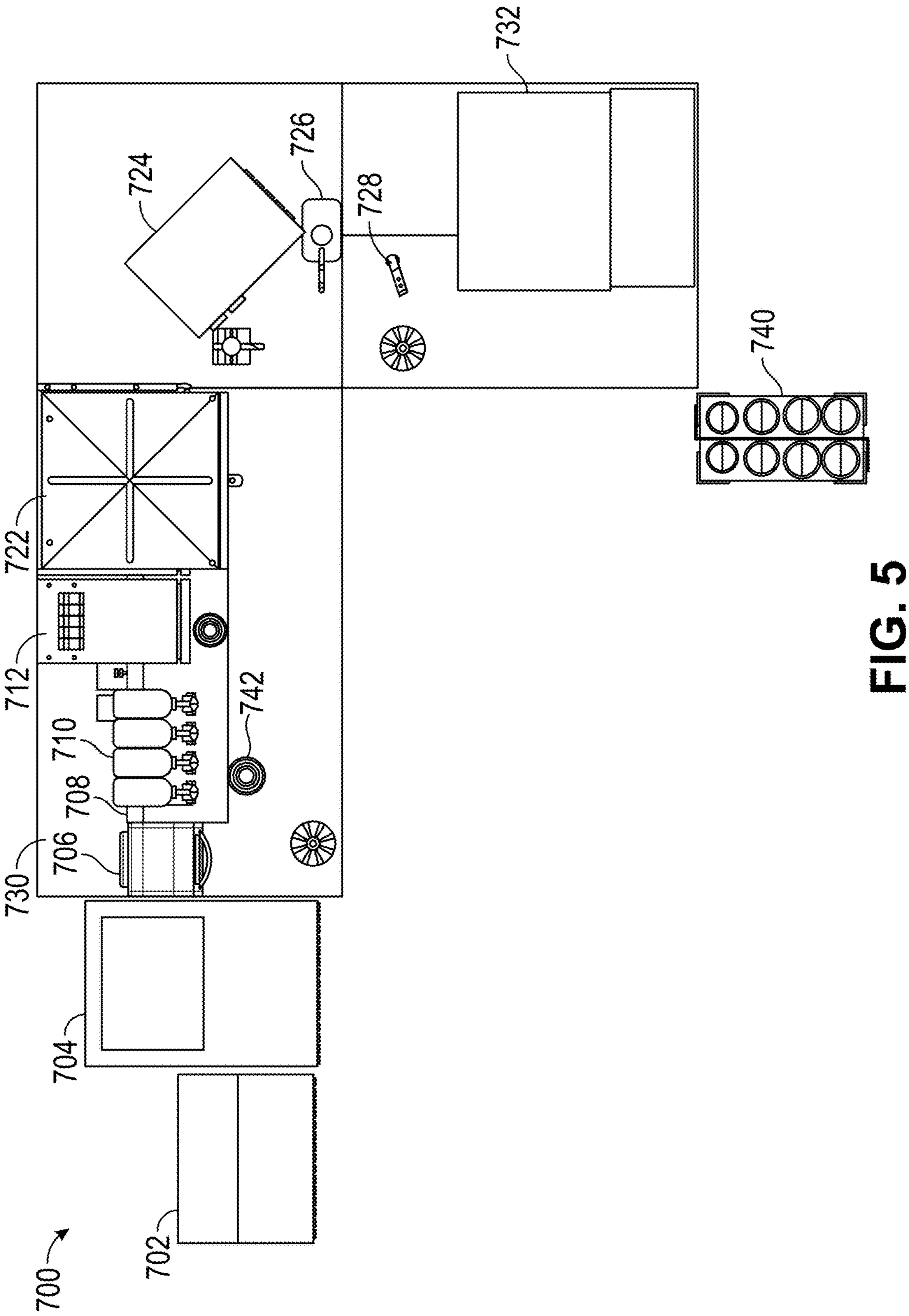
FIG. 5 illustrates a layout of the preparation system or station of FIG. 4.

As noted above, the beverage preparation system or station can be customizable and configured in a variety of ways. FIG. 4 illustrates an embodiment of a beverage preparation system or station 700. FIG. 5 illustrates a layout of the preparation system or station 700 of FIG. 4. As shown, the beverage preparation station 700 can have an L shape. The L shape can advantageously allow a user to access more surface area within a compact space. Additionally, the beverage preparation station 700 can include a table 730 to position various substations thereon. Various substations can also be positioned underneath or adjacent to the table 730, such as on a floor or a lower shelf. The beverage preparation station 700 can include one or more partitions or panels where substations or equipment can be mounted thereon. The beverage preparation station 700 can also include one or more walls that the table 730 is set against. This can advantageously allow substations or equipment to be mounted on the one or more walls, partitions, or panels. In some examples, the beverage preparation station can include a combination of walls, partitions or panels.

As shown in FIGS. 4-5, the beverage preparation station 700 can include substations or equipment positioned on a lower level, such as on a floor beneath or adjacent to the table 730. The beverage preparation system 700 can include equipment that can store and/or dispense ingredients or beverages. The ingredients can be positioned in cabinets or containers 702, 704, which can optionally be maintained at certain temperatures. The cabinets or containers 702, 704 can be positioned on the ground on a lower level. The ingredients for a particular drink, such as for cold brew, can be positioned in one of the containers 702, 704. A premixed beverage can also be positioned in one of the containers 702, 704. The beverage preparation station 700 can also include one or more refrigerators or cabinets 734, 736, 738 that can be positioned at a lower level, such as on the floor beneath a table. These refrigerators or cabinets 734, 736, 738 can include various beverages or ingredients, which can be organized in a variety of ways, such as by type or by drink.

The beverage preparation system 700 can include various appliances or equipment on a middle level, such as positioned on the surface of the table 730. As shown, the beverage preparation system 700 can include a blender 706, a cold brew or nitrogen dispenser 718, a tea or juice dispenser 720, one or more dry ingredient containers 714, and topping or liquid dispensers 716. The beverage preparation system 700 can include a topping dispenser or shaker 742 that can also be positioned on the table 730. The beverage preparation system 700 can also include a sauce dispenser 726 that is positioned on a surface of the table 730. The beverage preparation system 700 can also include an espresso machine 732 that can also include a steamer that is positioned on the table 730. The beverage preparation system 700 can also include a nitro tap 728 that can dispense nitro infused beverages, such as nitro cold brew. The beverage preparation system 700 can also include a nitrogen tank 740 positioned on the lower level, such as the floor adjacent to the table 730. The nitrogen tank 740 can be connected to the nitro tap 728.

The beverage preparation system 700 can also include an upper level that is positioned above the middle level. The upper level can be a wall or panel where equipment can be mounted thereon. The beverage preparation system 700 can include one or more liquid dispensers 710, which can contain beverages to be dispensed, mounted in the upper level. The liquid dispensers 710 can also include ingredients for beverages, such as milk, teas, or juices. The beverage preparation system 700 can also include one or more ingredient dispensers 712 that can be refrigerated or temperature controlled in some manner. The beverage preparation system 700 can include a shelf 708. The shelf 708 can be mounted on the wall and positioned below the liquid dispensers 710 and ingredient dispensers 712. The shelf 708 can advantageously hold and allow containers or cups to be positioned underneath the dispensers 710, 712 to receive the dispensed ingredients or drinks. The beverage preparation station 700 can also include a syrup dispenser 724 that is mounted on the wall or partition in the upper section. The upper level of the beverage preparation station 700 can include an ice dispenser 722. The ice dispenser 722 can also be an ice maker as well. The ice dispenser 722 can be positioned above the one or more ingredient dispensers 712. The ice dispenser 722 can also dispense ice into a container positioned on the shelf 708.

Computer Systems

Figure 6:
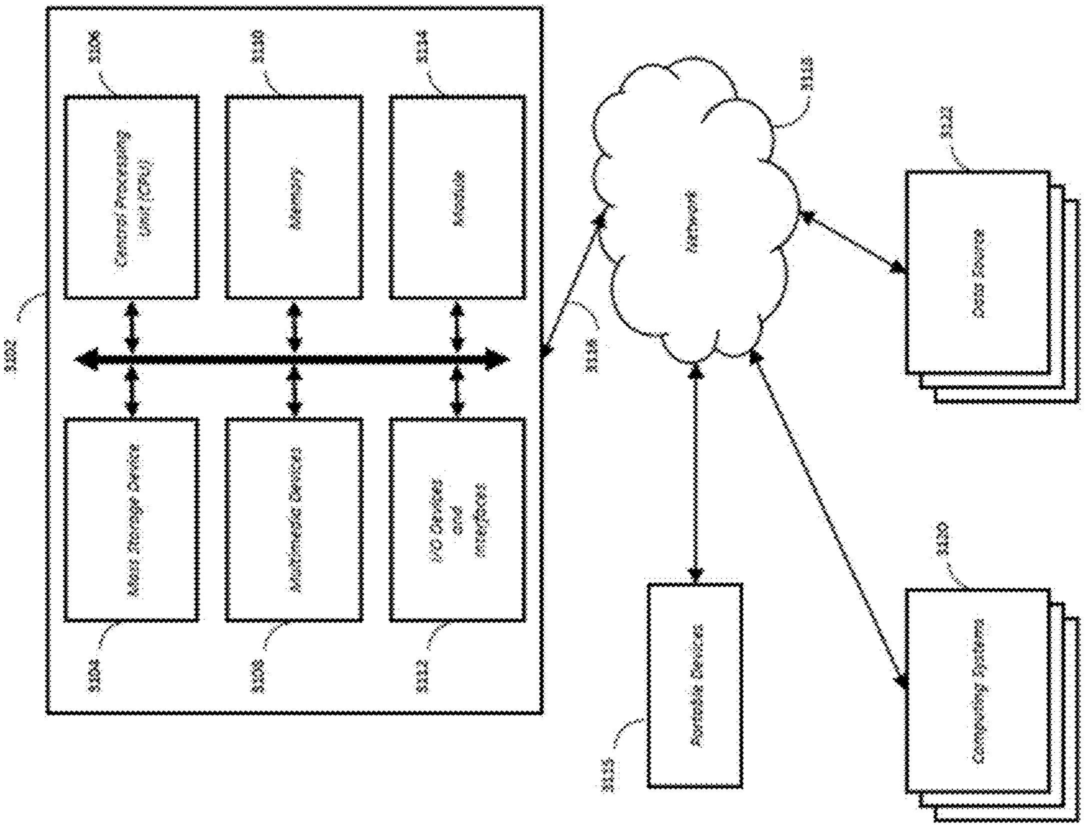
FIG. 6 illustrates a block diagram illustrating an embodiment of a computer hardware system configured to run software for implementing one or more embodiments of the system, methods, and devices disclosed herein.

FIG. 6 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 6. The example computer system 3102 is in communication with one or more computing systems 3120 and/or one or more data sources 3122 via one or more networks 3118. While FIG. 6 illustrates an embodiment of a computing system 3102, it is recognized that the functionality provided for in the components and modules of computer system 3102 may be combined into fewer components and modules, or further separated into additional components and modules.

The computer system 3102 can comprise a module 3114 that carries out the functions, methods, acts, and/or processes described herein. The module 3114 is executed on the computer system 3102 by a central processing unit 3106 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

Depending on the embodiment, certain acts, events, or functions of any of the processes or algorithms described herein can be performed in a different sequence, can be added, merged, or left out altogether (for example, not all described operations or events are necessary for the practice of the algorithm). Moreover, in certain embodiments, operations or events can be performed concurrently.

The various illustrative logical blocks, substations, routines, and algorithm steps described in connection with the embodiments disclosed herein can be implemented as electronic hardware, computer software, or combinations of both. To clearly illustrate this interchangeability of hardware and software, various illustrative components, blocks, substations, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and substations described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The computer system 3102 includes one or more processing units (CPU) 3106, which may comprise a microprocessor. The computer system 3102 further includes a physical memory 3110, such as random-access memory (RAM) for temporary storage of information, a read only memory (ROM) for permanent storage of information, and a mass storage device 3104, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 3102 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 3102 includes one or more input/output (I/O) devices and interfaces 3112, such as a keyboard, mouse, touch pad, and printer. The I/O devices and interfaces 3112 can include one or more display devices, such as a monitor, that allows the visual presentation of data to a user. More particularly, a display device provides for the presentation of GUIs as application software data, and multi-media presentations, for example. The I/O devices and interfaces 3112 can also provide a communications interface to various external devices. The computer system 3102 may comprise one or more multi-media devices 3108, such as speakers, video cards, graphics accelerators, and microphones, for example.

The computer system 3102 may run on a variety of computing devices, such as a server, a Windows server, a Structure Query Language server, a Unix Server, a personal computer, a laptop computer, and so forth. In other embodiments, the computer system 3102 may run on a cluster computer system, a mainframe computer system and/or other computing system suitable for controlling and/or communicating with large databases, performing high volume transaction processing, and generating reports from large databases. The computing system 3102 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 3102 illustrated in FIG. 6 is coupled to a network 3118, such as a LAN, WAN, or the Internet via a communication link 3116 (wired, wireless, or a combination thereof). Network 3118 communicates with various computing devices and/or other electronic devices. Network 3118 is communicating with one or more computing systems 3120 and one or more data sources 3122. The module 3114 may access or may be accessed by computing systems 3120 and/or data sources 3122 through a web-enabled user access point. Connections may be a direct physical connection, a virtual connection, and other connection type. The web-enabled user access point may comprise a browser module that uses text, graphics, audio, video, and other media to present data and to allow interaction with data via the network 3118.

Access to the module 3114 of the computer system 3102 by computing systems 3120 and/or by data sources 3122 may be through a web-enabled user access point such as the computing systems' 3120 or data source's 3122 personal computer, cellular phone, smartphone, laptop, tablet computer, e-reader device, audio player, or another device capable of connecting to the network 3118. Such a device may have a browser module that is implemented as a module that uses text, graphics, audio, video, and other media to present data and to allow interaction with data via the network 3118.

The output module may be implemented as a combination of an all-points addressable display such as a cathode ray tube (CRT), a liquid crystal display (LCD), a plasma display, or other types and/or combinations of displays. The output module may be implemented to communicate with input devices 3112 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 3102 may comprise a physical or logical connection established between a remote microprocessor and a mainframe host computer for the express purpose of uploading, downloading, or viewing interactive data and databases on-line in real time. The remote microprocessor may be operated by an entity operating the computer system 3102, including the client server systems or the main server system, an/or may be operated by one or more of the data sources 3122 and/or one or more of the computing systems 3120. In some embodiments, terminal emulation software may be used on the microprocessor for participating in the micro-mainframe link.

In some embodiments, computing systems 3120 who are internal to an entity operating the computer system 3102 may access the module 3114 internally as an application or process run by the CPU 3106.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 3102 may include one or more internal and/or external data sources (for example, data sources 3122). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Cache), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or Amazon QLDB), a non-relational database, or a record-based database.

The computer system 3102 may also access one or more databases 3122. The databases 3122 may be stored in a database or data repository. The computer system 3102 may access the one or more databases 3122 through a network 3118 or may directly access the database or data repository through I/O devices and interfaces 3112. The data repository storing the one or more databases 3122 may reside within the computer system 3102.

CERTAIN TERMINOLOGY

As used herein, the term "beverage" has its ordinary and customary meaning, and includes, among other things, any edible liquid or substantially liquid substance or product having a flowing quality (e.g., juices, coffee beverages, teas, milk, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. Numbers preceded by a term such as "about" or "approximately" include the recited numbers and should be interpreted based on the circumstances (e.g., as accurate as reasonably possible under the circumstances, for example. For example, "about 1 gram" includes "1 gram." In the embodiments described in this application, terms such as "about" or "approximately" within the specification or claims that precede values or ranges can be omitted such that this application specifically includes embodiments of the recited values or ranges with the terms "about" or "approximately" omitted from such values and ranges such that they can also be claimed without the terms "about" or "approximately" before the disclosed range. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

The following example embodiments identify some possible permutations of combinations of features disclosed herein, although other permutations of combinations of features are also possible.

A. SUMMARY

Although certain aspects, advantages, and features are described herein, it is not necessary that any particular embodiment include or achieve any or all of those aspects, advantages, and features. For example, some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable. In addition, although this disclosure describes certain embodiments and examples of beverage systems and methods, many aspects of the above-described systems and methods may be combined differently and/or modified to form still further embodiments or acceptable examples. All such modifications and variations are intended to be included herein within the scope of this disclosure.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage dispensing systems and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A method for preparing a beverage, the method comprising:

receiving one or more drink orders;

adding the one or more drink orders on a queue;

receiving a selection of the one or more drink orders on the queue;

building one or more recipes for the selected drink orders on the queue;

sending a first build step from a first recipe of the one or more recipes to a first substation;

determining the first build step has been completed by a user at the first substation;

sending a second build step for the first recipe to a second substation, the second substation being different from the first substation;

determining the second build step has been completed by the user at the second substation; and for each of the build steps, instructing the corresponding substation to dispense an ingredient or execute an action.

2. The method of claim 1, further comprising determining no predecessor is required for each of the build steps before sending the corresponding build step to the corresponding substation.

3. The method of claim 1, wherein instructing the corresponding substation to dispense the ingredient comprises:

dispensing a predetermined amount of the ingredient into a dosing vessel in a first position based on the corresponding build step;

determining the predetermined amount of the ingredient has been dispensed from the dosing vessel by the user; and determine the dosing vessel has been returned to the first position by the user.

4. The method of claim 1, wherein instructing the corresponding substation to dispense the ingredient comprises:

determining a container is positioned in a first position at the corresponding substation by the user;

dispensing a predetermined amount of the ingredient into the container based on the corresponding build step; and determining the predetermined amount of the ingredient has been dispensed from the container or the container has been removed from the corresponding substation by the user.

5. The method of claim 1, wherein instructing the corresponding substation to execute the action comprises:

determining a container is positioned in a first position at the corresponding substation by the user;

activating an equipment to perform the action; and determining the ingredient has been dispensed from the container or the container has been removed from the corresponding substation by the user.

6. The method of claim 1, wherein instructing the corresponding substation to dispense the ingredient comprises:

determining a trigger at the corresponding substation has been initiated by the user;

dispensing an amount of the ingredient into a container; and determining the amount of the ingredient has been dispensed from the container or the container has been removed from the corresponding substation by the user.

7. The method of claim 6, wherein the amount of the ingredient dispensed into the container is based on a time the trigger has been activated.

8. The method of claim 6, wherein the amount of the ingredient dispensed into the container is a predetermined amount based on the corresponding build step.

9. The method of claim 1, wherein instructing the corresponding substation to execute the action comprises sensing a manual action has been taken at the corresponding substation by the user.

10. The method of claim 1, wherein the selection of the one or more drink orders on the queue comprises at least two drink orders.

11. The method of claim 1, further comprising displaying the one or more drink orders on the queue on a main display.

12. The method of claim 1, further comprising displaying the corresponding build step sent to the corresponding substation on a display at the corresponding substation.

13. The method of claim 1, further comprising estimating a build time for each of the one or more drink orders.

14. The method of claim 13, wherein estimating the build time for each of the one or more drink orders is based on a number of user steps.

15. The method of claim 14, wherein estimating the build time for each of the one or more drink orders is based on a comparison of an estimated time to complete each of the build steps and an actual time to complete each of the build steps.

16. A method for preparing multiple beverages, the method comprising:
- receiving multiple drink orders;
- adding the multiple drink orders on a queue;
- receiving a selection of a plurality of drink orders of the multiple drink orders on the queue;
- building recipes for each of the selection of the plurality of drink orders on the queue;
- sending a first build step from a first recipe of the recipes to a first substation;
- determining the first build step has been completed by a user at the first substation;
- sending a second build step from the first recipe to a second substation, the first substation being different from the second substation;
- determining the second build step has been completed by the user at the second substation;
- sending a first build step from a second recipe of the recipes to the first substation, the second substation, or a third substation;
- determining the first build step from the second recipe has been completed by the user at the first substation, the second substation, or the third substation; and
- for each of the build steps, instructing the corresponding substation to dispense an ingredient or execute an action.

17. The method of claim 16, further comprising determining no predecessor is required for each of the build steps before sending the corresponding build step to the corresponding substation.

18. The method of claim 16, wherein instructing the corresponding substation to dispense the ingredient comprises:
- dispensing a predetermined amount of the ingredient into a dosing vessel in a first position based on the corresponding build step;
- determining the predetermined amount of the ingredient has been dispensed from the dosing vessel by the user; and
- determine the dosing vessel has been returned to the first position by the user.

19. The method of claim 16, wherein instructing the corresponding substation to dispense the ingredient comprises:
- determining a container is positioned in a first position at the corresponding substation by the user;
- dispensing a predetermined amount of the ingredient into the container based on the corresponding build step; and
- determining the predetermined amount of the ingredient has been dispensed from the container or the container has been removed from the corresponding substation by the user.

20. The method of claim 16, wherein instructing the corresponding substation to execute the action comprises:
- determining a container is positioned in a first position at the corresponding substation by the user;
- activating an equipment to perform the action; and
- determining the ingredient has been dispensed from the container or the container has been removed from the corresponding substation by the user.

21. The method of claim 16, wherein instructing the corresponding substation to dispense the ingredient comprises:
- determining a trigger at a corresponding substation has been initiated by the user;
- dispensing an amount of the ingredient into a container; and
- determining the amount of the ingredient has been dispensed from the container or the container has been removed from the corresponding substation by the user.

22. The method of claim 21, wherein the amount of the ingredient is based on a time the trigger has been activated.

23. The method of claim 21, wherein the amount of the ingredient dispensed into the container is a predetermined amount based on the corresponding build step.

24. The method of claim 16, wherein instructing the corresponding substation to execute the action comprises sensing a manual action has been taken at the corresponding substation by the user.

25. The method of claim 16, wherein the selection of the plurality of drink orders on the queue comprises at least two drink orders.

26. The method of claim 16, further comprising displaying the plurality of drink orders on the queue on a main display.

27. The method of claim 16, further comprising displaying the corresponding build step sent to the corresponding substation on a display at the corresponding substation.

28. The method of claim 16, further comprising estimating a build time for each of the plurality of drink orders.

29. The method of claim 28, wherein estimating the build time for each of the plurality of drink orders is based on a number of user steps.

30. The method of claim 29, wherein estimating the build time for each of the plurality of drink orders is based on a comparison of an estimated time to complete each of the build steps and an actual time to complete each of the build steps.

31. A beverage preparation system comprising:
- a plurality of substations, each of the plurality of substations configured to dispense an ingredient or perform an action;
- a main controller, the main controller configured to:
  - receive one or more drink orders;
  - add the one or more drink orders on a queue;

receive a selection of the one or more drink orders on the queue;

build one or more recipes for the selected drink orders on the queue;

send a first build step from a first recipe of the one or more recipes to a first substation;

determine the first build step has been completed by a user at the first substation;

send a second build step from the first recipe to a second substation, the second substation being different from the first substation;

determine the second build step has been completed by the user at the second substation; and for each of the build steps, instruct the corresponding substation to dispense an ingredient or execute an action.

* * * * *